(12) United States Patent
Grziwa et al.

(10) Patent No.: US 7,590,505 B2
(45) Date of Patent: Sep. 15, 2009

(54) MANUFACTURABLE MICROPOSITIONING SYSTEM EMPLOYING SENSOR TARGET

(75) Inventors: Wolfram Grziwa, Amherst, NH (US); Lothar Westerweck, San Jose, CA (US); Klaus Raschke, Weston, FL (US)

(73) Assignee: Flextronics AP, LLC, Broomfield, CO (US)

( * ) Notice: Subject to any disclaimer, the term of this patent is extended or adjusted under 35 U.S.C. 154(b) by 0 days.

(21) Appl. No.: 11/888,939

(22) Filed: Aug. 3, 2007

(65) Prior Publication Data
US 2008/0040069 A1    Feb. 14, 2008

Related U.S. Application Data

(63) Continuation-in-part of application No. 11/514,811, filed on Sep. 1, 2006, now Pat. No. 7,531,773.

(60) Provisional application No. 60/836,616, filed on Aug. 8, 2006, provisional application No. 60/715,533, filed on Sep. 8, 2005.

(51) Int. Cl.
*G06F 17/00* (2006.01)
*G03B 13/00* (2006.01)

(52) U.S. Cl. .................. 702/150; 702/94; 702/163; 396/89

(58) Field of Classification Search ............ 702/150, 702/94
See application file for complete search history.

(56) References Cited

U.S. PATENT DOCUMENTS

| | | | |
|---|---|---|---|
| 2,279,372 A | 4/1942 | Herzberger | 88/57 |
| 3,087,384 A | 4/1963 | Baur et al. | 88/57 |
| 3,599,377 A | 8/1971 | Dartnell | 51/284 |
| 3,609,270 A | 9/1971 | Jorgensen et al. | 200/67 |
| 4,879,592 A | 11/1989 | Ernest | 358/42 |
| 5,016,993 A * | 5/1991 | Akitake | 359/696 |
| 5,095,204 A | 3/1992 | Novini | 250/223 B |
| 5,177,638 A | 1/1993 | Emura et al. | 359/704 |

(Continued)

FOREIGN PATENT DOCUMENTS

EP    1148406 A2    10/2001

(Continued)

OTHER PUBLICATIONS

"High Precision Optical Assembly Starts Here," (4 pages) 1996, Opto-Alignment Technology, Inc.

*Primary Examiner*—Hal D Wachsman
(74) *Attorney, Agent, or Firm*—Haverstock & Owens LLP

(57) ABSTRACT

Embodiments of the present invention relate to systems and methods of position sensing that use a sensing target with a pattern of features thereupon, and to positioning modules and systems that position functional elements using such position sensing systems. A position sensing system includes an encoding module and a processing module. The encoding module has an active encoding region through which the sensing target is configured to move. Further, the encoding module is configured to generate a signal based on a portion of the sensing target within the active encoding region. The active encoding region has a dimension greater than the average critical dimension of the pattern of features. The processing module is configured to convert the signal generated into a position data based on an input range condition and an initial position condition.

19 Claims, 23 Drawing Sheets

U.S. PATENT DOCUMENTS

| | | | | |
|---|---|---|---|---|
| 5,196,963 | A | 3/1993 | Sato et al. | 359/699 |
| 5,272,567 | A | 12/1993 | Inoue | 359/696 |
| 5,546,147 | A | 8/1996 | Baxter et al. | 354/187 |
| 5,754,210 | A | 5/1998 | Haneda et al. | 347/116 |
| 5,805,362 | A | 9/1998 | Hayes | 359/819 |
| 5,835,208 | A | 11/1998 | Hollmann et al. | 356/124 |
| 5,926,965 | A | 7/1999 | Shijo et al. | 33/390 |
| 5,954,192 | A | 9/1999 | Iitsuka | 200/336 |
| 5,966,248 | A | 10/1999 | Kurokawa et al. | 359/697 |
| 6,091,902 | A | 7/2000 | Komatsuzaki et al. | 396/60 |
| 6,292,306 | B1 | 9/2001 | Betensky | 359/663 |
| 6,330,400 | B1 * | 12/2001 | Bittner et al. | 396/72 |
| 6,417,601 | B1 | 7/2002 | Kim | 310/333 |
| 6,597,516 | B2 | 7/2003 | Saitoh et al. | 359/694 |
| 6,760,167 | B2 | 7/2004 | Meehan et al. | 359/822 |
| 6,762,888 | B1 | 7/2004 | Oshima | 359/696 |
| 6,805,499 | B2 * | 10/2004 | Westerweck et al. | 396/448 |
| 6,869,233 | B2 | 3/2005 | Westerweck et al. | 396/460 |
| 6,940,209 | B2 | 9/2005 | Henderson | 310/323.02 |
| 7,010,224 | B2 | 3/2006 | Nomura | 396/144 |
| 7,088,525 | B2 | 8/2006 | Finizio et al. | 359/703 |
| 7,193,793 | B2 | 3/2007 | Murakami et al. | 359/791 |
| 7,301,712 | B2 | 11/2007 | Kamo | 359/785 |
| 7,330,648 | B2 | 2/2008 | Morinaga et al. | 396/144 |
| 7,394,602 | B2 | 7/2008 | Chen et al. | 359/785 |
| 7,400,454 | B2 | 7/2008 | Kubota et al. | 359/689 |
| 7,420,609 | B2 | 9/2008 | Yamaguchi et al. | 348/335 |
| 2002/0018140 | A1 | 2/2002 | Suemoto et al. | 348/358 |
| 2002/0102946 | A1 | 8/2002 | SanGiovanni | 455/90 |
| 2003/0174419 | A1 | 9/2003 | Kindler et al. | 359/819 |
| 2004/0056970 | A1 * | 3/2004 | Westerweck et al. | 348/240.3 |
| 2004/0203532 | A1 | 10/2004 | Mizuta | 455/90.3 |
| 2004/0258405 | A1 | 12/2004 | Shiratori et al. | 396/458 |
| 2005/0264670 | A1 | 12/2005 | Yamaguchi et al. | 348/335 |
| 2006/0049720 | A1 | 3/2006 | Henderson et al. | 310/328 |
| 2006/0056389 | A1 | 3/2006 | Monk et al. | 370/352 |
| 2006/0113867 | A1 | 6/2006 | Sakatani et al. | 310/323.17 |
| 2006/0291061 | A1 | 12/2006 | Iyama et al. | 359/614 |
| 2007/0053672 | A1 | 3/2007 | Westerweck et al. | 396/79 |
| 2007/0074966 | A1 | 4/2007 | Yamamoto et al. | 200/547 |
| 2007/0077051 | A1 | 4/2007 | Toor et al. | 396/144 |
| 2007/0077052 | A1 | 4/2007 | Chang | 396/144 |
| 2007/0086777 | A1 | 4/2007 | Fujita | 396/452 |
| 2007/0122146 | A1 | 5/2007 | Ryu | 396/529 |

FOREIGN PATENT DOCUMENTS

| | | |
|---|---|---|
| EP | 1148406 A3 | 6/2002 |
| EP | 1357726 A1 | 10/2003 |
| GB | 1 378515 | 12/1974 |
| GB | 2315186 A | 1/1998 |
| GB | 2387063 A | 10/2003 |
| JP | 11-072678 | 3/1999 |
| JP | 2002-286987 | 10/2002 |

* cited by examiner

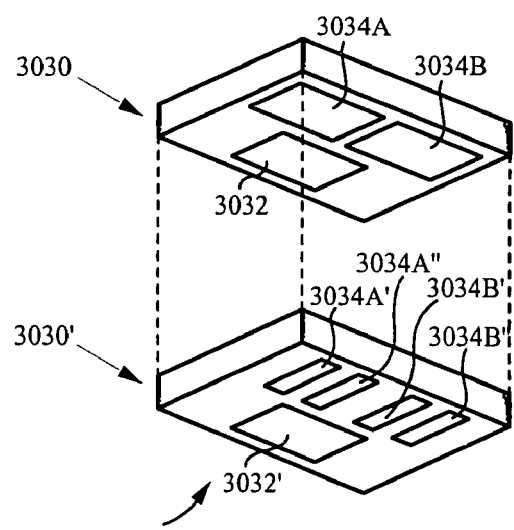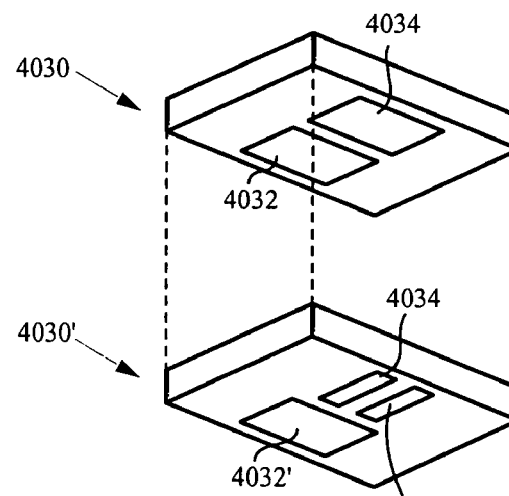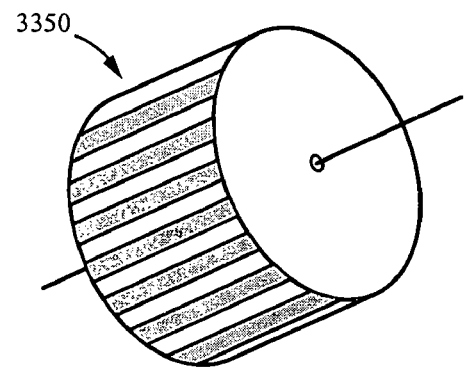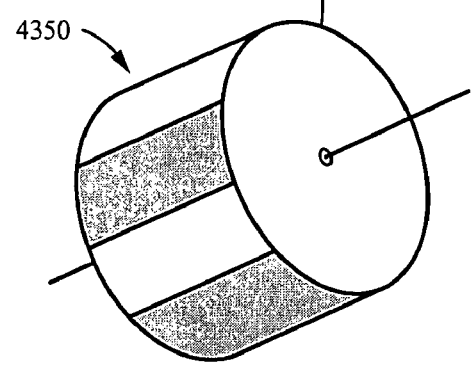
Fig. 13A                              Fig. 13B

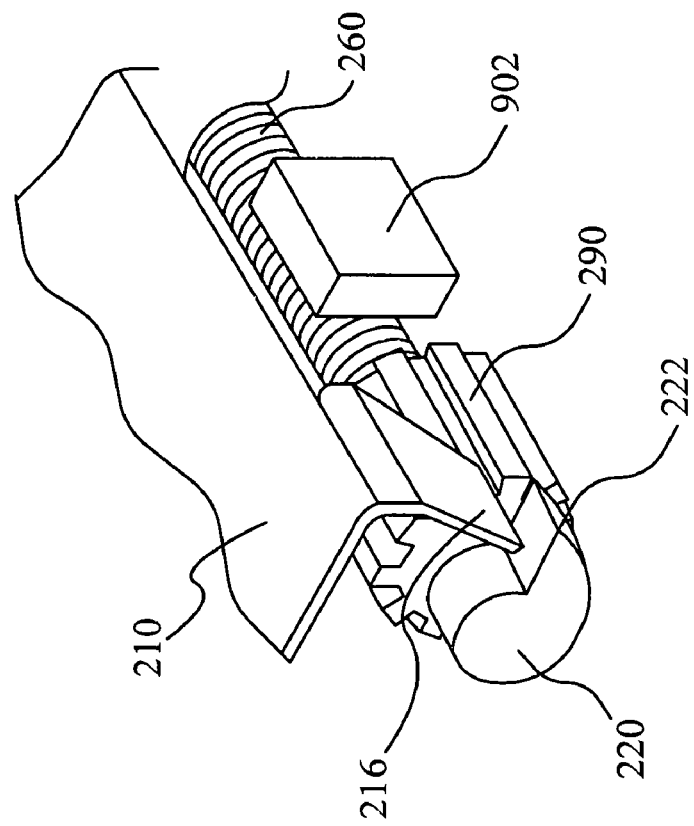
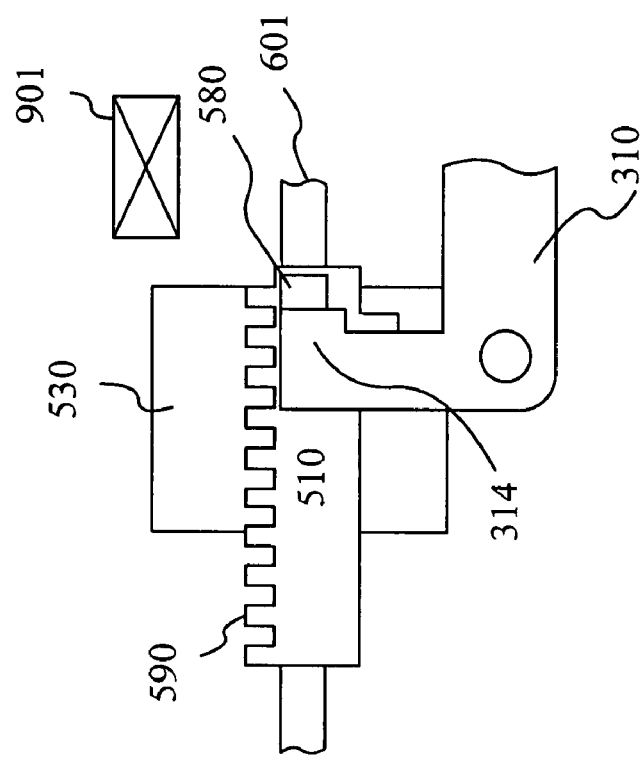
Fig. 14B
Fig. 14A

MANUFACTURABLE MICROPOSITIONING SYSTEM EMPLOYING SENSOR TARGET

RELATED APPLICATIONS

This patent application claims priority under 35 U.S.C. 119(e) of the U.S. Provisional Pat. App. No. 60/836,616, filed Aug. 8, 2006, entitled MINIATURIZED ZOOM MODULE WITH ROTATIONAL PIEZO ACTUATOR WITH ANTI-LOCK FEATURE, EVEN FORCE DISTRIBUTION, SHOCK DAMAGE PREVENTION AND A NOVEL POSITION SENSING METHODS", which is hereby incorporated by reference.

In addition, this patent application is a continuation-in-part of U.S. patent application Ser. No. 11/514,811, filed on Sep. 1, 2006 and entitled "AUTO-FOCUS AND ZOOM MODULE, now U.S. Pat. No. 7,531,773 which claims priority under 35 U.S.C. 119(e) of the U.S. Provisional Pat. App. No. 60/715,533, filed Sep. 8, 2005, entitled "3× ZOOM MINI MODULE", both of which are also hereby incorporated by reference.

FIELD OF THE INVENTION

The invention relates to controlled positioning and position sensing of functional elements, including optical elements, within a small form factor component. More particularly, this invention is directed toward an auto-focus and zoom module.

BACKGROUND

Recently, there have been numerous developments in digital camera technology that rely on positioning of micro-scale elements. One such development is the further miniaturization of optical and mechanical parts to the millimeter and sub millimeter dimensions. The reduction in size of the moving parts of cameras has allowed the implementation of modern digital camera and optical technology into a broader range of devices, which are continually being designed and constructed into smaller and smaller form factors. Though moving parts shrink, they still must be accurately positioned for optical and mechanically precise tasks. Further, the components responsible for precisely positioning such components also must become smaller.

A wide variety of strategies for small-scale positioning of optical and other functional elements are known. However, there is no available solution for accurate, small-scale positioning within a small form-factor and economically manufacturable device.

SUMMARY OF THE DISCLOSURE

Embodiments of the present invention relate to systems for and methods of position sensing that use a sensing target with a pattern or repeating feature thereupon. Further, embodiments relate to positioning of functional elements using such position sensing systems. In particular, some embodiments relate to positioning of optical elements.

In some embodiments of the present invention, a position sensing system uses a sensing target which have a pattern of features with an average critical dimension. The position sensing system includes an encoding module and a processing module. The encoding module has an active encoding region through which the sensing target is configured to move. Further, the encoding module is configured to generate a signal based on a portion of the sensing target within the active encoding region. The active encoding region has a dimension greater than the average critical dimension of the pattern of features. The processing module is configured to convert the signal generated into position data based on an input range condition and an initial position condition.

In certain embodiments of the present invention, a micropositioning module comprises a functional group, a drive shaft, an actuator, a sensing target, and a position sensing system. The functional group is coupled to the drive shaft. The actuator is configured for translating the drive shaft to move the functional group. The sensing target is configured to represent movement of the functional group at a first resolution, preferably during movement of the functional group by the drive shaft. The position sensing system is configured with the sensing target to perform several steps. First, to detect movement of the functional group at the first resolution as raw movement data. Then, to process the raw movement data into corrected movement data having a second resolution. Finally, to translate the corrected movement data into position data representing the position of the first functional group. The second resolution is greater than the first resolution.

In some other embodiments, a micropositioning module includes a functional group, an actuator, a sensing target, and a position sensing system. The functional group is coupled to a lead screw so that rotation of the lead screw results in translation of the functional group along an axis parallel to the lead screw. The actuator is configured for rotating the lead screw. The sensing target is configured to represent rotation of the lead screw at a first resolution. The position sensing system is configured with the sensing target to detect rotation of the lead screw at the first resolution as raw rotation data. The position sensing system processes the raw rotation data into corrected rotation data having a second resolution, wherein the second resolution is greater than the first resolution. The position sensing system converts the corrected rotation data into position data representing a position of the functional group.

Some embodiments relate to a method of detecting a position of a functional group coupled to a sensing target configured to represent movement of the functional group at a first resolution. The method comprises steps of using the sensing target to detect movement of the functional group at the first resolution, encoding raw movement data representing the detected movement, processing the raw movement data into corrected movement data having a second resolution, wherein the second resolution is greater than the first resolution, and converting the corrected movement data into position data representing the position of the functional group.

BRIEF DESCRIPTION OF THE DRAWINGS

The novel features of the invention are set forth in the appended claims. However, for purpose of explanation, several embodiments of the invention are set forth in the following figures.

FIG. 13A is an exploded isometric view of an assembly for position sensing in accordance with some embodiments of the invention.

FIG. 13B is an exploded isometric view of an assembly for position sensing in accordance with some embodiments of the invention.

FIG. 14A is a detailed view of a position-sensing portion of an optical module in accordance with some embodiments of the invention.

FIG. 14B is a detailed view of a position-sensing portion of an optical module in accordance with some embodiments of the invention.

DETAILED DESCRIPTION

In the following description, numerous details and alternatives are set forth for purpose of explanation. However, one of ordinary skill in the art will realize that the invention can be practiced without the use of these specific details. In other instances, well-known structures and devices are shown in block diagram form in order not to obscure the description of the invention with unnecessary detail.

FIGS. 1 to 10C in particular deal with an auto-focus and zoom module employing a positioning system consistent with the present invention. These figures and the accompanying discussion, as well as related discussion in the position sensing section, relate to embodiments of the invention implemented in an optics context, but should not be taken as limiting the invention. The full scope of the invention is best appreciated by reading the appended claims.

Figure 1:
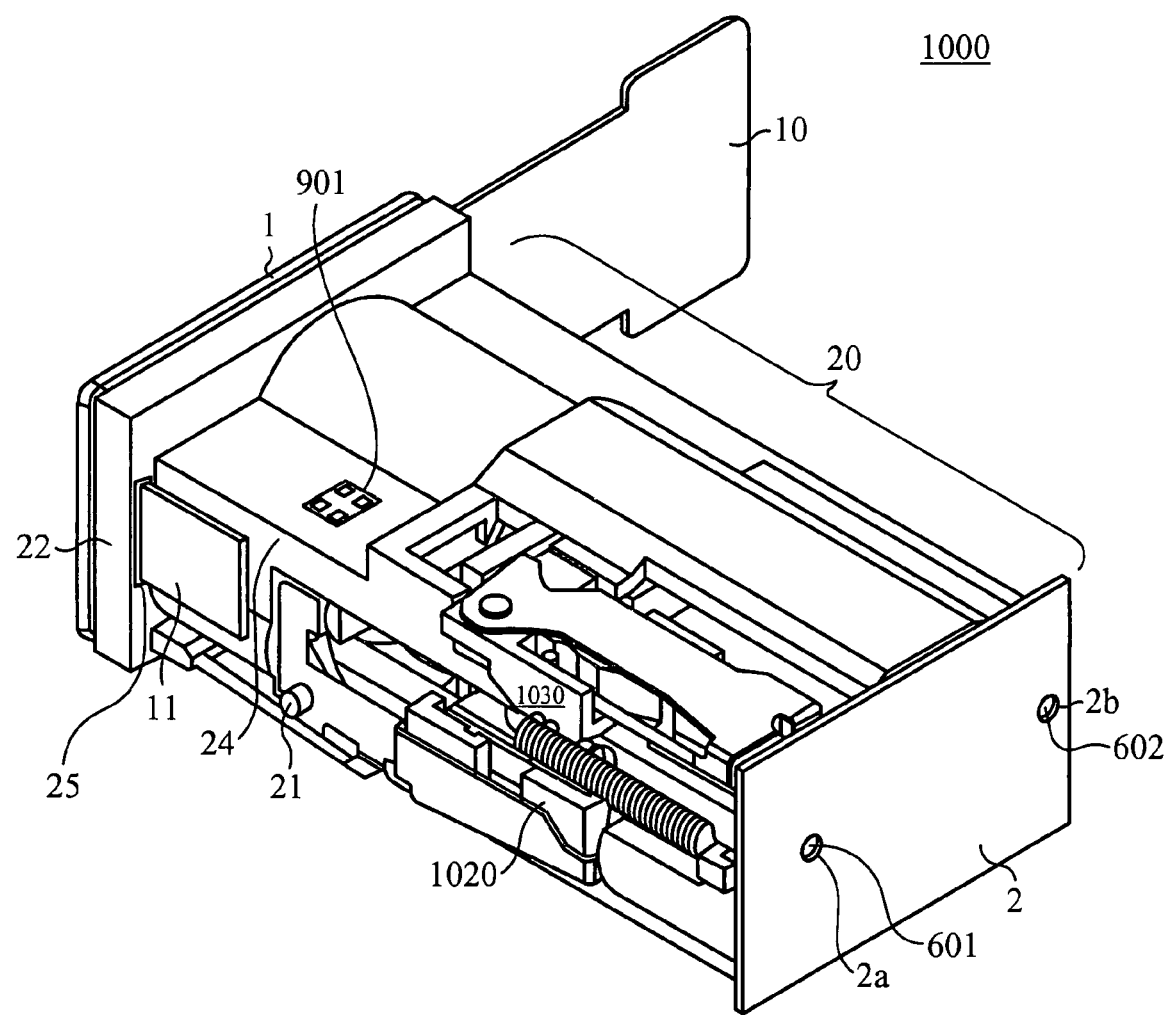
FIG. 1 is an isometric view of an auto-focus and zoom module in accordance with some embodiments of the invention.
Figure 2:
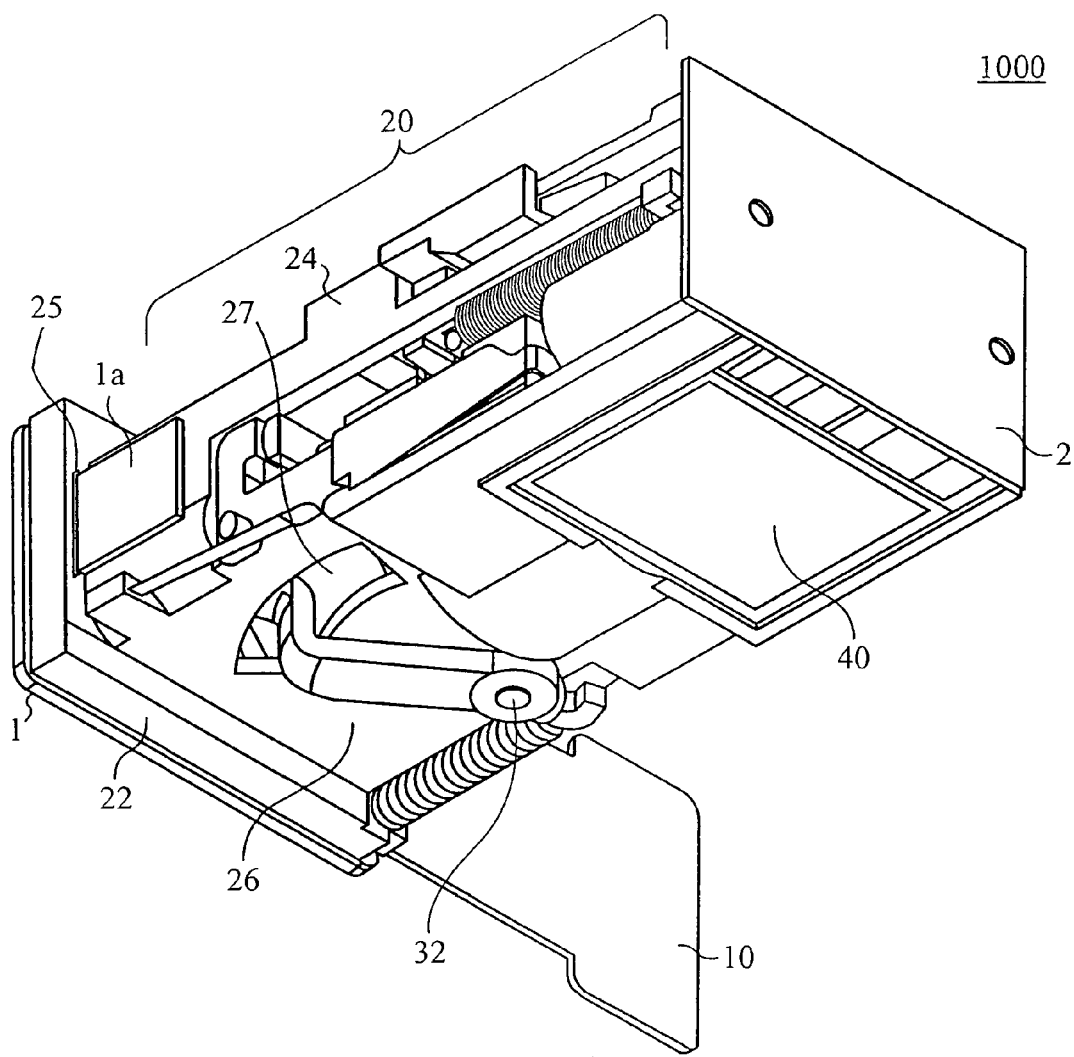
FIG. 2 is an isometric view of an auto-focus and zoom module in accordance with some embodiments of the invention.

FIGS. 1 and 2 illustrate an auto-focus and zoom module 1000 in accordance with some embodiments of the invention. The module 1000 is shown with the exterior electro magnetic interference (EMI) shield removed.

As shown, the module is built over an image sensor board 10. The module 1000 comprises a stiffener 1 disposed on a first side of the image sensor board 10, and a main structure 20 disposed opposite the stiffener 1. Preferably, the stiffener 1 and the main body 20 are coupled with one another and with the image sensor board 10.

The main structure 20 comprises a base guide portion 22. The base guide portion 22 includes features configured to retain the guide pins 601 and 602. The end guide plate 2 is disposed opposite the base guide portion 22. The holes 2a and 2b interface with and retain the guide pins 601 and 602, respectively. The base guide portion 22 further includes a void region (not shown) configured to permit passage of radiation, e.g. visible light, through the lens structure of the module (discussed below) to the image sensor (discussed below) of the image sensor board 10. In addition, the base guide portion 22 includes a pass-thru 25 configured to permit the image sensor board extension 11 to pass therethrough.

Disposed between the base guide portion 22 and the end guide plate 2 are the main body 20 and other components of the module 1000. The main body 20 further includes the upper structure 24, and the lower structure 26. Both the lower 26 and upper 24 structures include specialized features configured to mate with or allow pass-through of working components of the module 1000. Thus, the main body 20 provides both a structure framework and functional support to the workings of the module 1000.

For example, the lower structure 26 includes the pivot boss 32, configured to act as a fulcrum for the low-variation pre-load lever assembly (discussed below). In addition, the lower structure 26 includes the pass through 27, configured to permit movement of the lever assembly through a desired range. Similarly, the upper portion 24 includes a pass through configured to permit coupling between a main PCB and the sensor 901 discussed below.

A variety of components of the module 1000 are coupled to the main body 20. Some of these components are immobilized relative to the main body 20. In addition to the guide pins 601 and 602, the actuator housings 1020 and 1030 are coupled to the main body 20 in an immobile position. Thus, the actuator housings 1020 and 1030 are in a fixed position relative to the guide pins 601 and 602.

Figure 3:
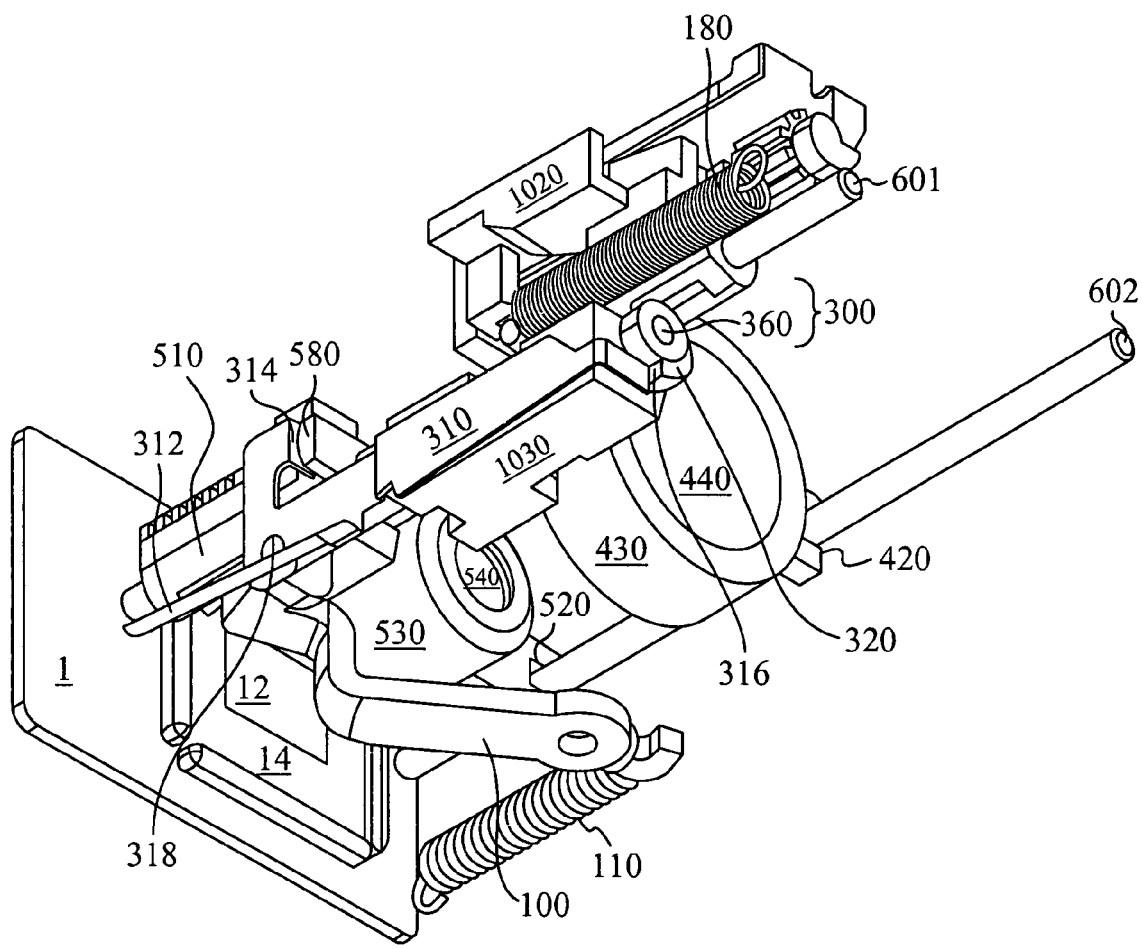
FIG. 3 is an isometric view of internal parts of an auto-focus and zoom module in an end stop position in accordance with some embodiments of the invention.
Figure 4:
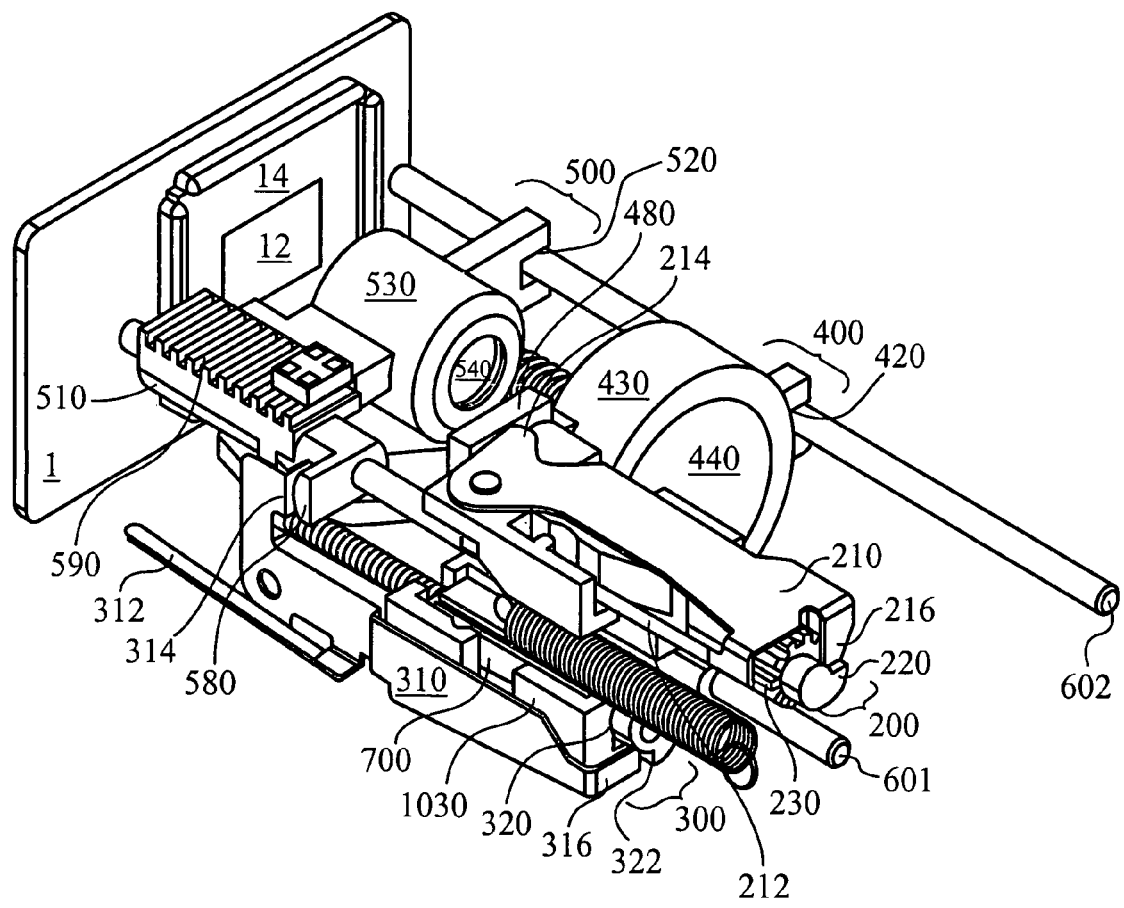
FIG. 4 is an alternative isometric view of internal parts of an auto-focus and zoom module in end stop position accordance with some embodiments of the invention.

FIGS. 3 and 4 show the internal components of the module 1000. The main body 20 (shown in FIGS. 1 and 2) is not shown. As shown in these figures, the module 1000 includes a front optics group 400, a rear optics group 500, and an image sensor 14. The front optics group 400 and rear optics group 500 each typically comprise one or more optical elements such as a lens group. One of ordinary skill will recognize both complex and simple lens arrangements for the optics groups 400 and 500.

Optionally attached to the main body 20 and the end guide plate 2 is a prism 40, (shown in FIG. 2). The module 1000 preferably further includes a casing and a cover mechanism, as well as an EMI shield as mentioned above. The cover mechanism preferably prevents light leakage and dust contamination from affecting the internal components of the module, particularly the lens groups 400 and 500 and the image sensor 14. In some embodiments, a single external housing functions as both an EMI shield and a cover mechanism. An infrared (IR) filter and/or a low pass filter is optionally attached to the image sensor board 10.

FIGS. 3 and 4 illustrate further details of the module 1000. As mentioned above, the actuator housings 1020 and 1030 are coupled to the main body 20. This coupling, along with the coupling between the main body 20, the end guide plate 2, and the guide pins 601 and 602 positions and secures the components relative to one another, and to the target region 12 of the image sensor 14, providing a chassis for an auto-focus and zoom module capable of providing an image with a magnification and zoom to the target region 12.

Image Sensor

As shown in the figures, the image sensor 14 is substantially planar. The image sensor 14 can be of any type conventionally known in the art such as a CMOS image sensor or alternatively a CCD image sensor. The plane of the image sensor is preferably perpendicular to the axes of the guide pins 601 and 701. Typically, the module 1000 is configured to provide an image to the image sensor 14 along an image vector parallel to these axes.

Guide Pins

FIGS. 3 and 4 illustrates a guide pin arrangement for an auto-focus and zoom module in accordance with the present invention. Some embodiments include a pair of guide pins, while other embodiments employ a different number of guide pins. Regardless of their number, the guide pins 601 and 602 are typically mounted along a linear axis of the module 1000 to permit the rear barrel 530 and the front barrel 430 to move relative to the image sensor 14. In the module 1000, the primary guide pin 601 and the secondary guide pin 602 are aligned so that their axes are substantially parallel to each other. Further, the lead screw assemblies 200 and 300 are also aligned so that their axes are substantially parallel to each other, and to the guide pins 601 and 602.

Typically, the guide pins 601 and 602 are coupled to the main body 20 and the end guide plate 2 as outlined above. Preferably, the guide pins are coupled on opposite sides of the image vector of the image sensor 14. However, one skilled in the art will recognize that other configurations are possible. The lead screws 200 and 300 are typically disposed along an edge of the image sensor 14 and parallel to its optical axis.

In some embodiments, the range of motion provided to the rear barrel 530 and parallel to the guide pins 601 and 602 is approximately 7 millimeters. In some embodiments, the range of motion provided to the front barrel 430 and parallel to the guide pins 601 and 602 is approximately 2 millimeters. Due to this range of motion, however, the guide pins 601 and 602 of some embodiments often affect the form factor of the module 1000. Hence, some embodiments further include means for modifying and/or concealing the form factor of the module 1000.

Prism Feature

Certain embodiments additionally include a prism feature, e.g. 40 of FIG. 2. This feature allows the auto-focus and zoom module to be disposed and/or mounted in a variety of orientations. For instance, the dimension available to a particular implementation along the initial direction of an image vector is often limited such that the module is preferably disposed lengthwise in the vertical plane of an enclosure. This orientation allows the range of motion of the front and rear barrels along the guide pins, as described above, to be implemented in a device having a small width and/or depth form factor. For example, in a mobile phone implementation where a user will want to aim a camera at a desired image using the display as a viewfinder, the image vector is advantageously perpendicular to the display for usability purposes. However, the dimension of the device perpendicular to the display is often the thinnest dimension of a mobile phone.

Referring to FIGS. 2 and 3, the prism feature 40 of some embodiments is mounted adjacent to the front barrel 430. The prism 40 redirects the light from an image at an angle with respect to the front barrel 430. As described above, the front barrel 430 typically houses a front lens group. The front lens group contains one or more front optical elements. Hence the prism 100 allows the module 1000 to be disposed in a variety of orientations within a device that is typically held at an angle with respect to the subject being viewed and/or photographed. Though a prism is preferably used, it will be apparent that other optical elements such as a mirror can be used to redirect the light from the object to the image sensor 14.

Lens System

Figure 5A:
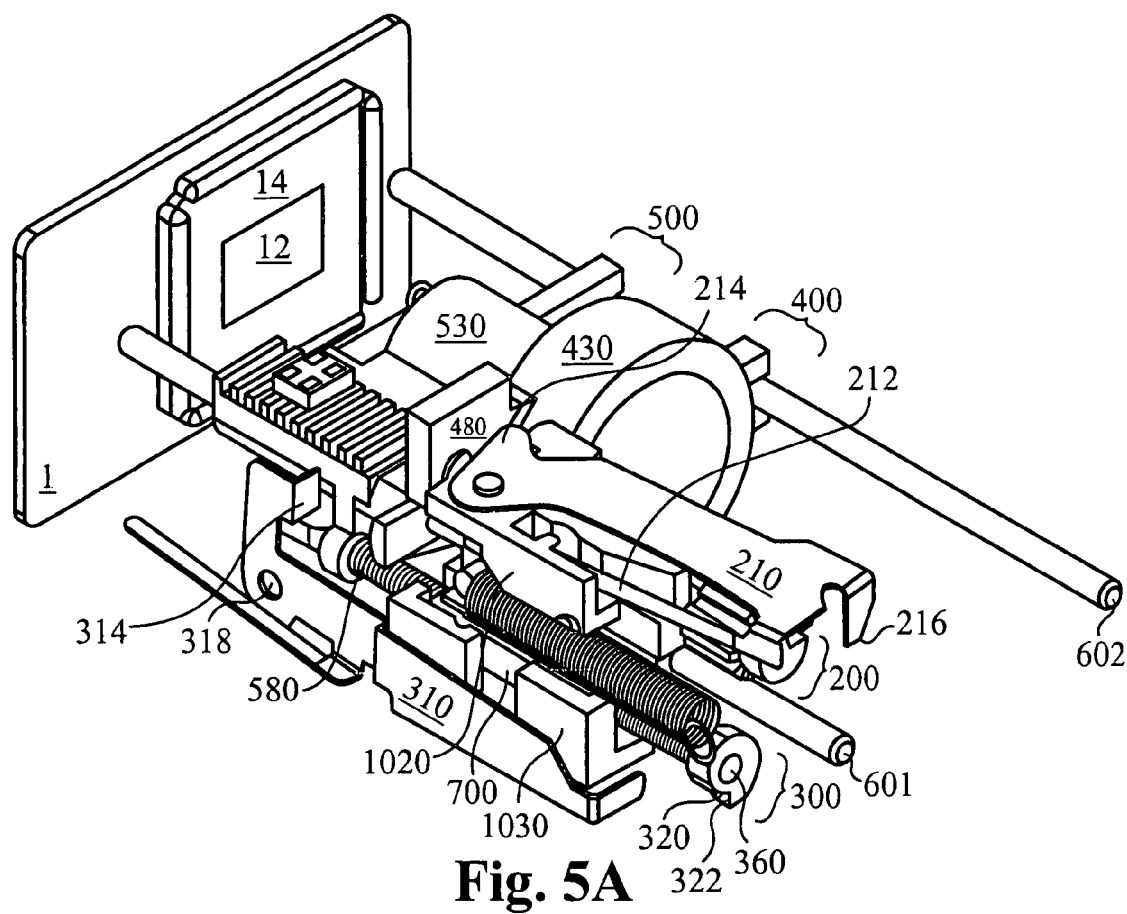
FIG. 5A is an isometric view of internal parts of an auto-focus and zoom module in a mid position in accordance with some embodiments of the invention.

As shown in FIGS. 3, 4 and 5A, the rear optics group 500 and front optics group 400 have preferred constructions. The rear optics group 500 further includes the rear barrel 530, the rear guide sleeve 510, and the rear guide slot 520. The rear barrel 530 typically houses one or more lenses or other optical elements. As illustrated, the rear barrel 530 houses the rear lens 540. The rear barrel 530 is preferably a substantially cylindrical body with a central axis. The rear lens 540 is configured to direct light along the central axis of the rear barrel 530. The rear guide sleeve 510 is an elongated, substantially cylindrical body coupled to the rear barrel 530 so that the central axis of the rear barrel 530 and an axis of the rear guide sleeve 510 are substantially parallel. The rear guide slot 520 is a slotted feature configured to interface with a cylinder.

The front optics group 400 further includes the front barrel 430, the front guide sleeve 410, and the front guide slot 420. The front barrel typically houses the front lens group 440. The front barrel 430 is a substantially cylindrical body with a central axis. The front lens group 440 is configured to direct light along the central axis of the front barrel 430. The front guide sleeve 410 (FIG. 6B) is an elongated, substantially cylindrical body coupled to the front barrel 430 so that the central axis of the front barrel 430 and an axis of the front guide sleeve 410 are substantially parallel. The front guide slot 420 is a slotted feature configured to interface with a cylinder.

Lens-Guide Pin Interface

Figure 6A:
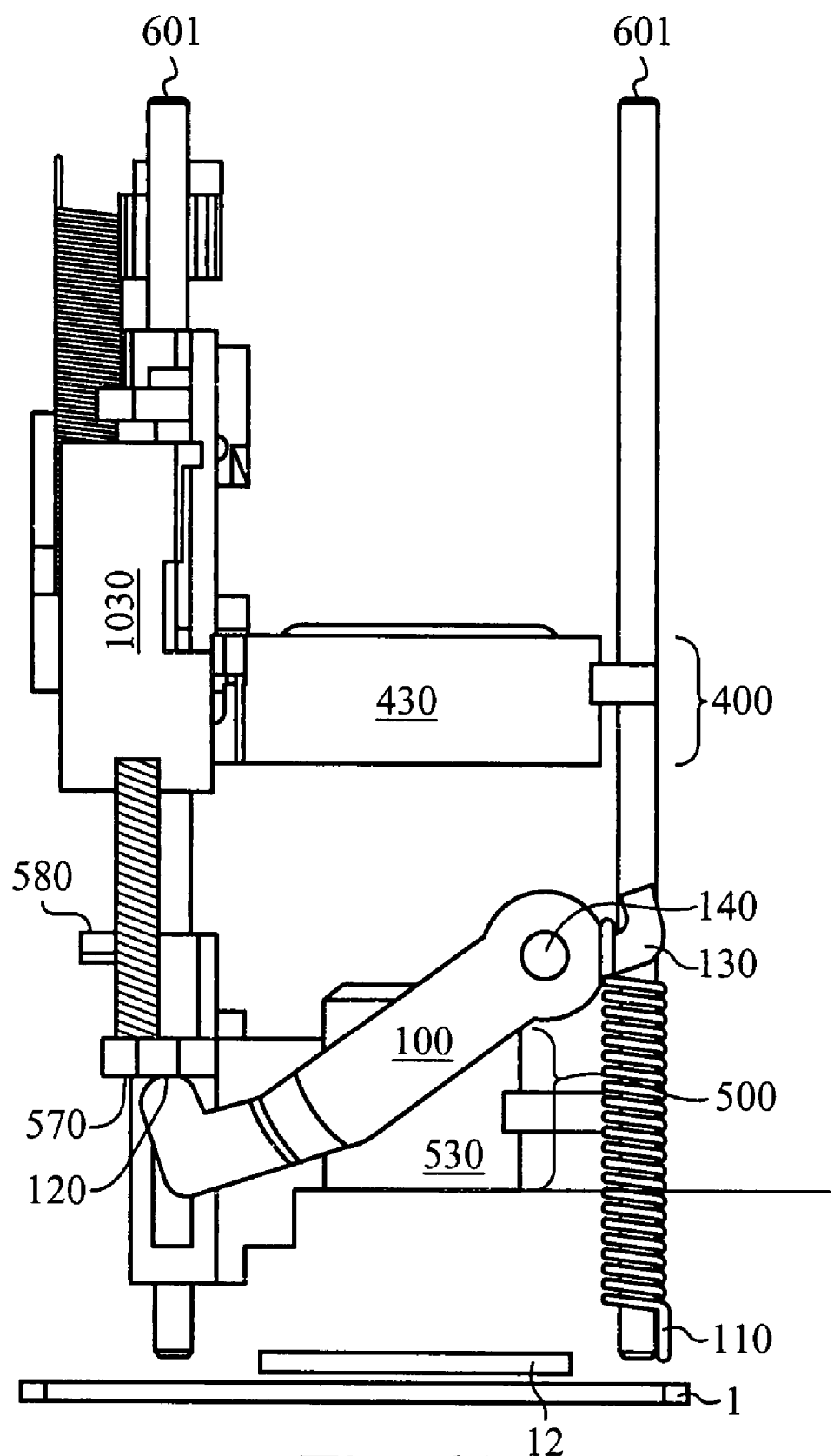
FIG. 6A is an alternative plan view of internal spring elements of an auto-focus and zoom module in a mid position in accordance with some embodiments of the invention.
Figure 6B:
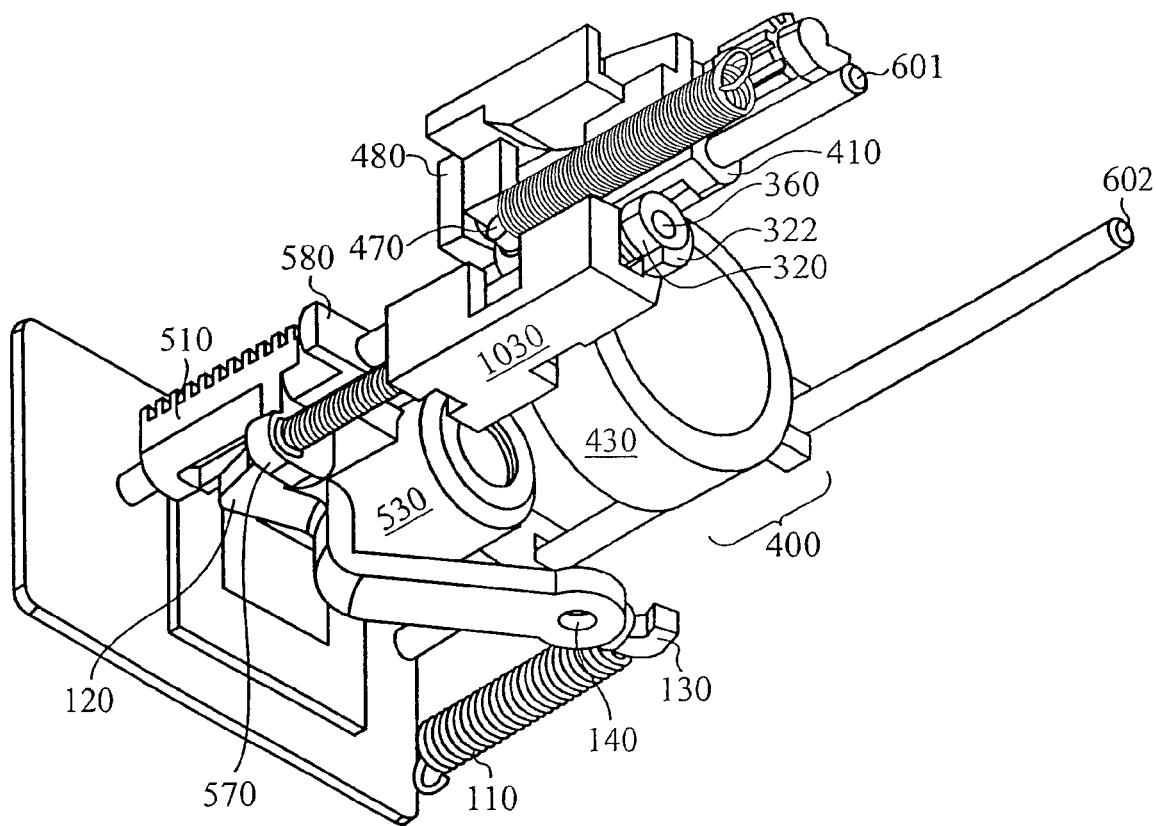
FIG. 6B is an isometric view of internal spring elements of an auto-focus and zoom module in a mid position in accordance with some embodiments of the invention.
Figure 7A:
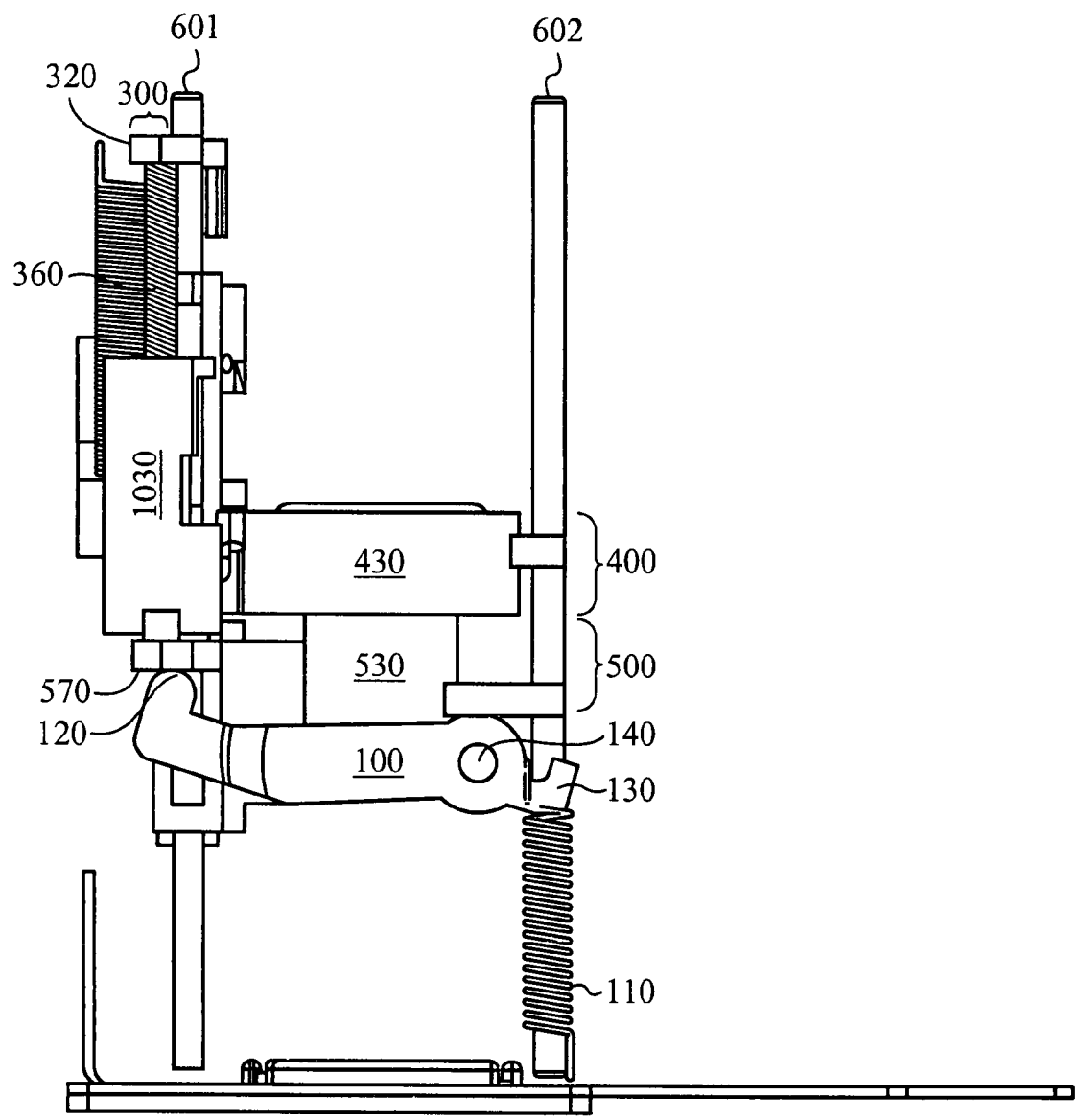
FIG. 7A is a plan view of internal spring elements of an auto-focus and zoom module in tele position in accordance with some embodiments of the invention.
Figure 7B:
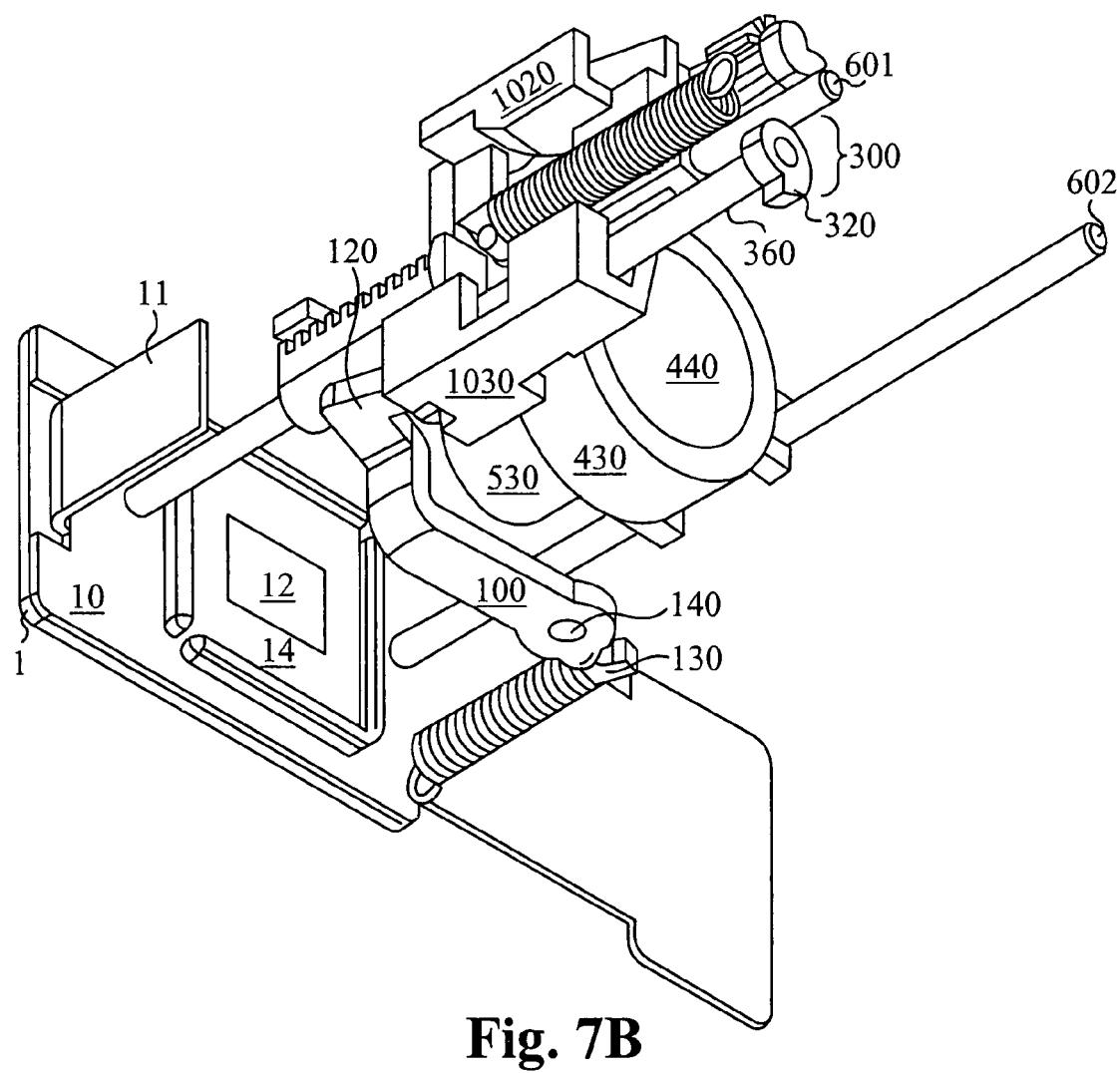
FIG. 7B is an isometric view of internal spring elements of an auto-focus and zoom module in tele position in accordance with some embodiments of the invention.

Referring now to FIG. 6B, the front optics group 400 includes the front guide sleeve 410, which couples with the primary guide pin 601. As illustrated, the front guide sleeve 410 is substantially elongated relative to the front barrel 430. Further, the front guide sleeve 410 is rigidly coupled to the front barrel 430. This configuration prevents the front optics group 400 from rotating around an axis perpendicular to the axis of the primary guide pin 601, but permits rotation around the axis of the primary guide pin 601. The rear optics group 500 includes the rear guide sleeve 510, which also couples with the primary guide pin 601. As illustrated, the rear guide sleeve 510 is substantially elongated relative to the rear barrel 530. Further, the rear guide sleeve 510 is preferably rigidly coupled to the rear barrel 530. This configuration prevents the rear optics group 500 from rotating around an axis perpendicular to the primary guide pin 601, but permits rotation around the axis of the guide pin.

Referring now to FIG. 4, the front optics group 400 also includes the front guide slot 420, configured to couple with the secondary guide pin 602. The coupling between the guide slot 420 and the secondary guide pin 602 prevents the front optics group 400 from rotating around the axis of the primary guide pin 601. The coupling between the front optics group 400 and guide pins 601 and 602 permits the front optics group 400 to translate along an axis substantially parallel to the two guide pins.

The rear optics group 500 also includes the rear guide slot 520, configured to couple with the secondary guide pin 602. The coupling between the guide slot 520 and the secondary guide pin 602 prevents the rear optics group 500 from rotating around the axis of the primary guide pin 601. The coupling between the rear optics group 500 and guide pins 601 and 602 permits the rear optics group 500 to translate along an axis substantially parallel to the two guide pins.

Actuator Modules

Preferably, the actuators used within embodiments of the present invention are vibrational actuators. Most preferably, these vibrational actuators are of the type that oscillates in a standing wave pattern to drive a threaded shaft placed therein to rotate, thus rotating the threaded shaft. Embodiments of the present invention include certain preferred standing wave patterns for driving the vibrational actuators. However, a variety of standing wave patterns are contemplated.

The present invention contemplates a variety of actuator constructions. These include vibrational actuators as disclosed in U.S. Pat. No. 5,966,248 issued Oct. 12, 1999 and U.S. Pat. No. 6,940,209 issued Sep. 6, 2005. These also include actuators as shown for example in FIGS. 10A to 10C. The actuator 700' comprises a flexible body surrounded by a plurality of piezoelectric strips, 701, 702, and 704. A fourth strip, not shown, is disposed opposite the strip 701. The strips are arranged symmetrically around a flexible body that has a plurality of thread-interface features disposed therein. The thread interface features are configured to mate with the threads of the lead screw 360'. During operation, the piezoelectric strips drive an oscillating motion within the flexible body. Actuators of this type typically require an operating preload. Preferably, this preload is applied to the lead screw via techniques disclosed elsewhere in this document.

In order to effectively drive a threaded shaft by using the preferred vibrational actuators, some embodiments of the present invention include specialized actuator housings, designed to constrain the actuator to only the degree necessary and also to provide shock protection for the actuator. In addition, the actuator housings permit close positioning of actuator relative to the guide pin and optics group. Typically, each actuator within the embodiment is combined with an actuator housing to form an actuator module.

Figure 10A:
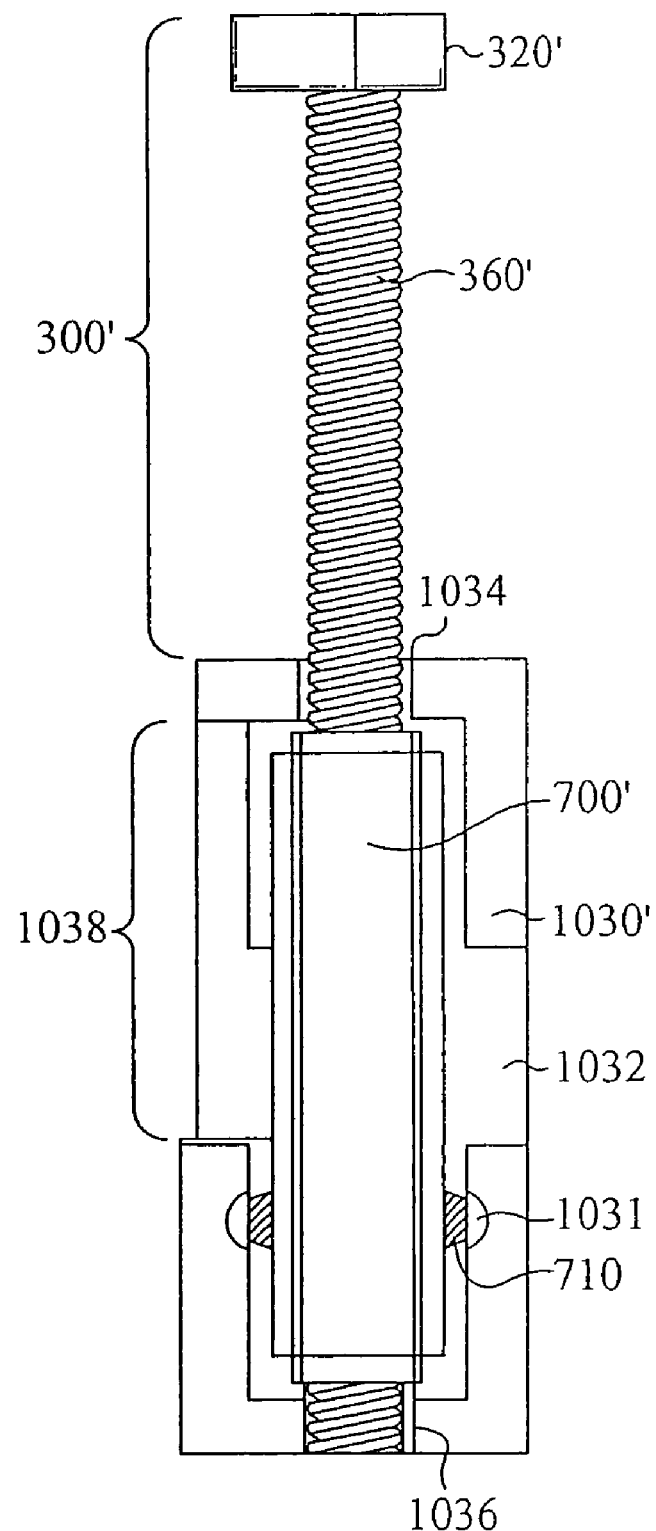
FIG. 10A is a plan view of a prior art actuator assembly utilized in some embodiments of the invention.
Figure 10B:
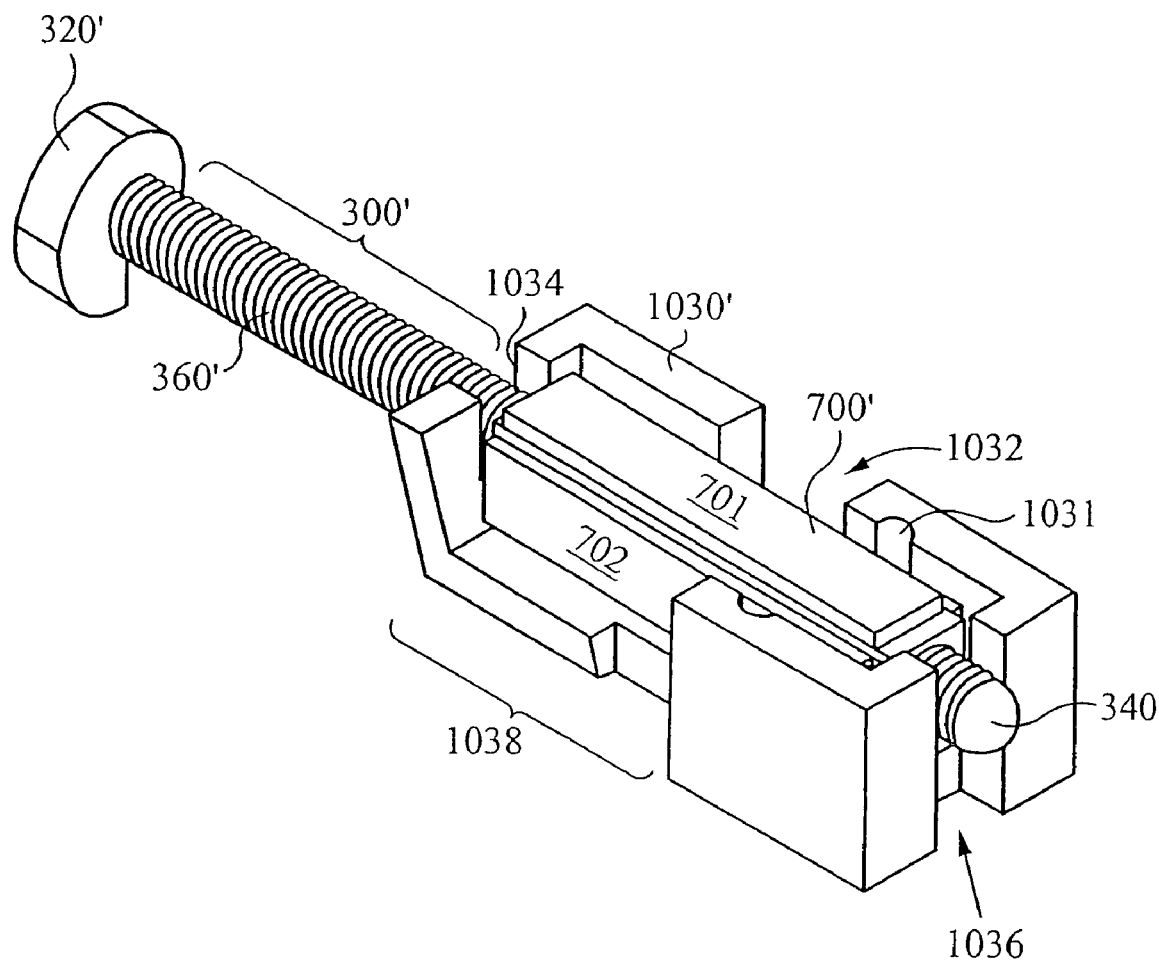
FIG. 10B is an isometric view of a prior art actuator assembly utilized in some embodiments of the invention.
Figure 10C:
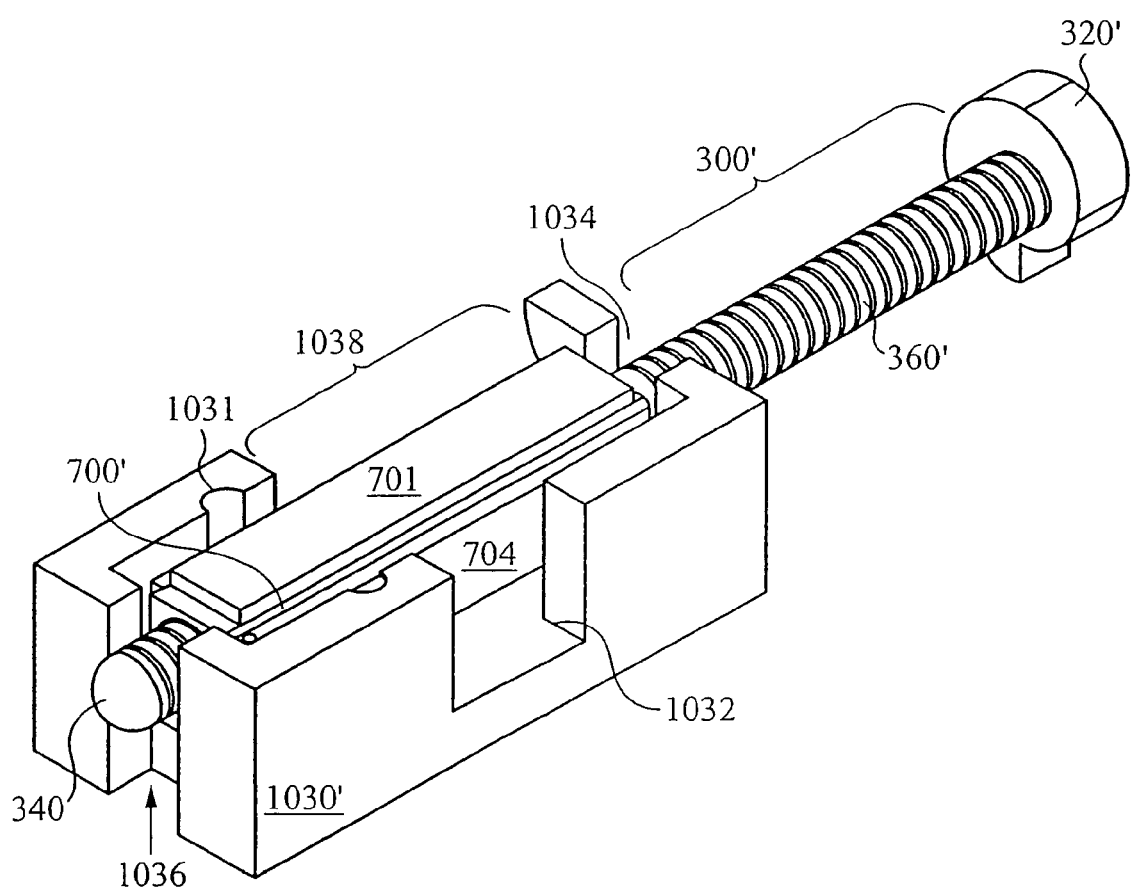
FIG. 10C is an isometric view of a prior art actuator assembly utilized in some embodiments of the invention.

Some embodiments of the present invention include actuator modules such as those illustrated in FIGS. 10A to 10C. A typical actuator module, as illustrated, includes an actuator 700', an actuator housing 1030', and a flexible coupling 710.

The flexible coupling 710 constrains a portion of the actuator 700' to a substantially fixed position relative to the actuator housing 1030'. This permits the actuator to drive a lead screw to translate relative to the actuator housing 1030'. For example, the contact pads 710 prevent the actuator 700' from rotating relative to the housing.

However, by constraining only a portion of the actuator 700', the embodiment permits relatively free vibration of the actuator 700' to impart movement to a lead screw, e.g. 360'. Further, because the flexible coupling 710 preferably constrains the actuator 700' at a node point of the preferred standing wave pattern of the actuator 700', the effect of the constraint on the efficiency of the actuator is reduced. Preferably, the fixed location is chosen to be a node point of a variety of standing wave patterns, thus permitting efficient operation of the actuator under a variety of conditions.

As illustrated, the actuator housing 1030' includes openings 1034 and 1036 to admit the lead screw 360'. In addition, the housing includes openings 1032 and 1038 configured to admit electrical connections to a main PCB board (not shown). In addition, the actuator housing 1030' is specialized to prevent shock damage to the actuator 700'. The actuator housing 1030' is preferably a five-sided chamber that forms a parallelepiped therein. This parallelepiped, called the actuator retention region, is larger in volume than the actuator 700'. Further, the actuator retention region is larger along every dimension than the corresponding dimension of the actuator 700'. In addition, when the actuator 700' is constrained within the actuator retention region by the flexible coupling 710, preferably a surface of the actuator 700' is parallel with the surface of the parallelepiped that does not include a portion of the actuator housing. Further, the ends of the actuator 700' are preferably approximately equidistant from the openings 1034 and 1036, respectively. Thus, the actuator 700' is suspended within the retention region with a buffer distance between it and each adjacent surface of the actuator housing 1030'.

Further, the size of the parallelepiped actuator retention region and the actuator 700' are matched to one another, and to the type of flexible coupling 710 used to retain the actuator. Preferably, the buffer distance between the actuator 700' and the inner surfaces of the housing 1030' adjacent to the openings 1034 and 1036 are chosen relative to the maximum displacement permitted prior to failure by the flexible coupling 710. Thus, during a mechanical shock, such as received from dropping a cell phone, the actuator 700' will encounter an inner surface of the housing 1030' prior to stretching the flexible coupling 710 to failure. In addition, similar stretching along axes perpendicular to the lead screw 360' is prevented by the coupling between the lead screw 360' and the actuator 700'.

Figure 9:
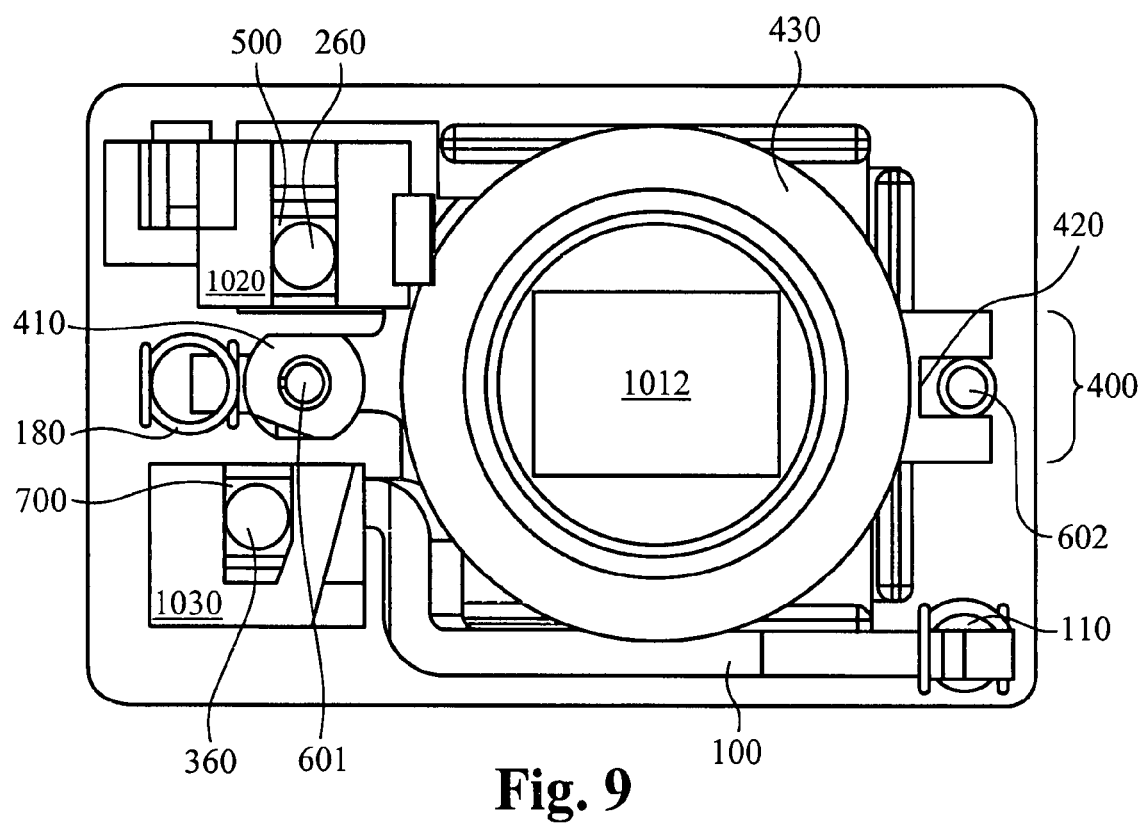
FIG. 9 is a plan view along the optical axis of an auto-focus and zoom module in accordance with some embodiments of the invention.

The actuator housings 1030 and 1020 permit close positioning of actuators 700 and 500 relative to the primary guide pin 601. As shown in FIG. 9, this close positioning is permitted because the open end of the actuator housings 1020 and 1030 allow the actuators 500 and 700 to be disposed at a surface of the actuator module. Thus, the actuators 500 and 700 are placed proximate to the primary guide pin 601, leaving clearance for the guide sleeves 410 and 510.

Close positioning increases precision by minimizing torque effects as the actuators 200 and 300 drive the optics modules 400 and 500, respectively. The center of mass of the optics modules 400 and 500 lies between the guide pins 601 and 602. The lead screw coupling surfaces 480 and lie off center. Thus, driving the optics modules 400 and 500 by the coupling surfaces 480 and 570 tends to introduce a torque. The guide pins, including the primary guide pin 601, counteract the torque effect. However, configuring the modules so that the actuators 500 and 700, and the coupling surfaces, are nearly aligned with the guide pin 601 reduces the amount of torque on the guide pins.

Lead Screw Assemblies

Referring now to FIGS. 10A to 10C, the exemplary lead screw assembly 300' is shown coupled with the actuator housing 1030'. The lead screw assembly 300' is structured around the lead screw 360'. The assembly includes cam 320' and the referencing cap 340. The lead screw 360' comprises a threaded region 5, a first end, and a second end. The first end of the lead screw 360' and the referencing cap 340 are integrally formed.

Lead Screw-Optics Group Interface

Figure 8A:
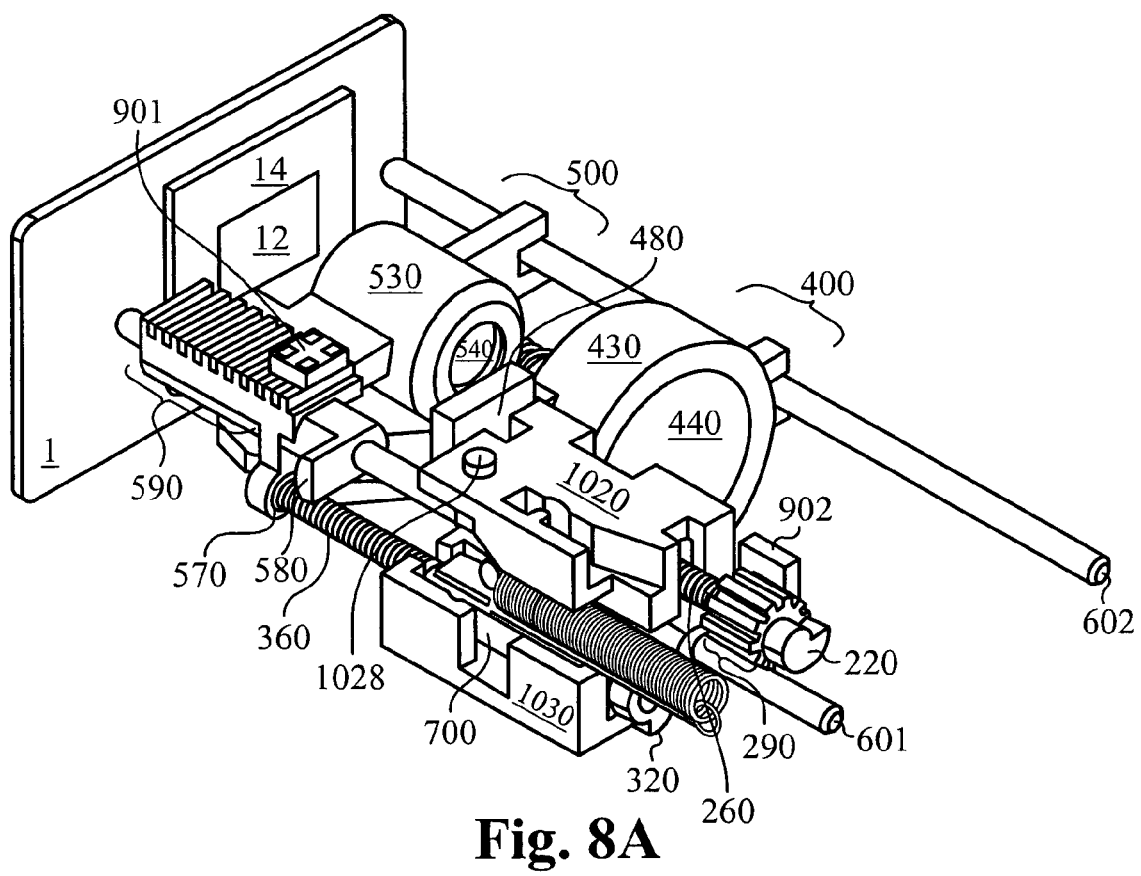
FIG. 8A illustrates an auto-focus and zoom module in an end stop position in accordance with some embodiments of the invention.

Referring now to FIG. 8A, the front optics group 400 and rear optics group 500, respectively, couple with the lead screws through the lead screw coupling surfaces 480 and 570 respectively. Both primary guide sleeves 410 and 510 couple with the primary guide pin 601.

In the preferred configuration, movement of a lead screw transmits force through its counterpart lead screw coupling surface. Since the coupling surfaces are each a rigidly coupled component of an optics group, translation of a coupling surface results in translation of its counterpart optics group. However, a simple rigid connection between a coupling surface and a lead screw can accomplish this function. The illustrated configuration provides additional benefits by isolating the optics group from non-translational movements of the lead screw. Preferably, a reference cap coupled to the first end of a lead screw contacts the coupling surface, for example, see the reference cap 340 of FIG. 10C.

The small contact area between the reference cap and the coupling surface serves to minimize friction, permitting movement of the coupling surface relative to the reference cap and the lead screw in the axes orthogonal to the axis of the lead screw. This configuration isolates most mechanical vibration or disturbance of the lead screw from the optics group. Further, the isolation means that only the translational degree of freedom of the lead screw need be controlled to achieve a required precision for positioning of the optics group. Though non-translational movement of the lead screw is not present in the preferred embodiment, these features permit embodiments of the present invention to deal with this type of wobble when present.

To maintain coupling between a coupling surface and lead screw, some embodiments of the present invention rely on preload springs otherwise required for accurate operation of the actuators.

Preload Springs

In addition to the features mentioned above, the actuators used within embodiments of the present invention typically utilize a low-variation preload force. This preload is provided by a spring with a low force constant. In small displacement implementations this method typically works well.

Some embodiments of the present invention rely on spring forces which act on the optics groups to provide preload to the lead screws used to drive the groups. Thus, to an extent, the required displacement of the optics group determines the type of spring force transmission mechanism required.

For example, in some embodiments of the present invention the front optics group 400 is used for focusing and zoom operations and need only be displaced a millimeter or two. Because the preferred range of motion of the front optics group 400 is less than two millimeters, choosing a low force constant spring for the spring and coupling it to directly exert spring forces on the optics group results in a relatively low variation preload.

Figure 8B:
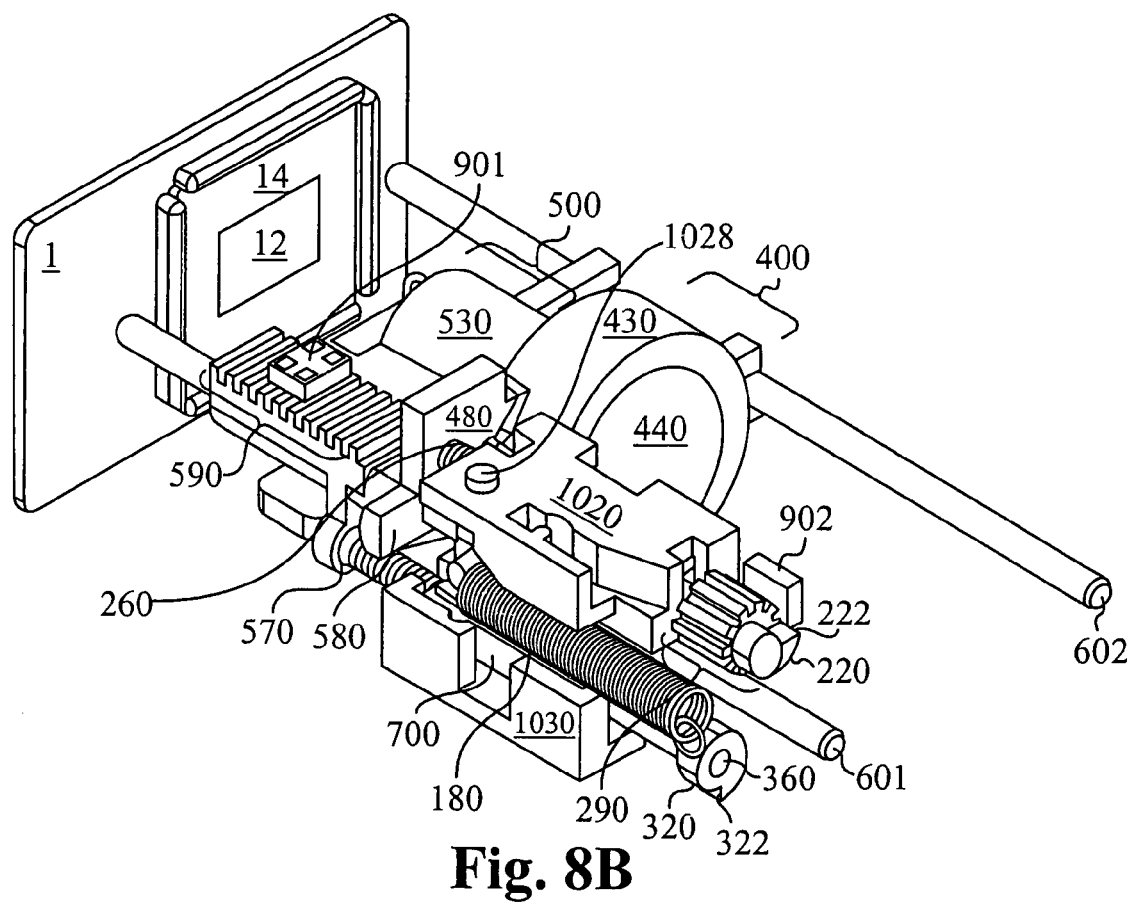
FIG. 8B illustrates an auto-focus and zoom module in a mid position in accordance with some embodiments of the invention.

As illustrated in FIG. 8B, the front lead screw coupling surface 480 is adjacent to the first end of the lead screw 260. To couple the surface with the lead screw and provide preload, the preload spring urges the surface against the lead screw. Because of the small movements involved in focusing, directly providing the spring force is permissible in this case. Thus, the front preload spring 180 is coupled to the front optics group 400 via the preload interface feature 470 (FIG. 6B) and configured to directly exert force on the optics group 400.

In another example, the rear optics group 500 is used for zoom operations and need be displaced several millimeters or more. Because the preferred range of motion of the front optics group 500 is more than four millimeters, choosing a low force constant spring for the spring and coupling it to directly exert spring forces on the optics group results to high a variation in preload.

As illustrated in FIGS. 6A and 6B, the rear lead screw coupling surface 570 is adjacent to the lead screw 360. To couple the surface with the lead screw and provide preload, thus preload spring urges the surface against the lead screw. However, direct provision of the preload is undesirable in this case.

Thus, the preload spring 110 is configured on the opposite end of a preload lever 100. The zoom preload lever 100 includes a pivot hole 140 configured to mate with the pivot boss 32 of the main body 20. In addition, the preload lever 100 includes a preload spring hook 130 and a preload force transfer point 120.

The pivot hole 140 is skewed toward the preload spring hook 130 so that movement at the hook end of the preload lever 100 is amplified at the force transfer point end. By the same mechanism, large movements at the force transfer point 120 end of the zoom lever 100 translate into relatively smaller movements at the spring hook 130 end. This reduces variations in the preload force over the relatively larger travel distance of the zoom lens system. Preferably, the location of the pivot hole 140 is chosen to decrease the travel from the force transfer end to the spring hook end, in this example by a factor of five. Other embodiments employ a different factor.

The spring hook 130 is coupled with the preload spring 110, and the force transfer point 120 is coupled with one face of the rear lead screw coupling surface 570. The coupling surface 570 is also adjacent to the lead screw 360. To couple the surface with the lead screw and provide preload, the preload spring must urge the surface against the lead screw. Indirectly providing the spring force from the rear preload spring 110 through the lever 100 means that travel of the rear optics group 500 translates indirectly into extension of the preload spring 110. The specific proportionality of group travel to spring extension depends on the positioning of the lever pivot relative to the force transfer point and spring hook. As described above, the preferred ratio is one-fifth.

In either case, indirect or direct preload spring force application, the opposite end of the preload spring is preferably coupled to the main body 20.

Sensing Target

Some embodiments of the present invention include sensing targets to provide feedback on positioning. In some embodiments, a sensing target is disposed on a lead screw. In some embodiments, a sensing target is disposed on an optics group. Both linear and rotational targets can be used with the present invention.

A lead screw assembly in accordance with some embodiments of the present invention includes a sensing target. Some lead screw assemblies, such as the assembly 300' of FIG. 10A to 10C, do not include a sensing target. However, the lead screw assembly 200, shown for example in FIG. 8C, includes the sensing target 290 positioned adjacent to the cam 220. In the illustrated embodiment, the target 290 is a rotational target. The use of a rotational target is preferred in contexts that require very fine positioning.

Typically, a sensing target adapted for coupling to a lead screw includes a feature that interfaces with a registering feature of lead screw. In some embodiments the sensing target interfaces with the threads of a lead screw. The position sensing target 290 is configured to engage with the position sensor 902.

In some embodiments, a sensing target is included as part of an optics group. For example, in FIGS. 8A to 8C, the sensing target 590 is configured as part of the rear optics group 500. Here, the target 590 is constructed as an integral part of the optics group 500. However, in some embodiments, a sensing target is modular, or merely coupled with an optics group.

In addition, the sensing target 590 is a linearly moving sensing target. Linearly moving targets are acceptable in relatively low precision positioning applications. Further, linearly moving targets are preferred in applications where the target moves over a relatively large range. Here, the linearly moving target is employed in the rear optics group 500 because the group is used for zoom purposes.

In FIG. 8A the module is in an end stop position. In some embodiments, the position sensors 901 and 902 are disengaged from the sensing targets 590 and 290, respectively, during end stop. In this position, also illustrated in FIGS. 3 and 4, the lead screw positions are registered at a mechanical hard stop via means discussed elsewhere in this document. Thus, because in these embodiments the lead screw positions correlate with the optical group positions, the registering of the lead screws defines the position of the optical groups as well.

Figure 8C:
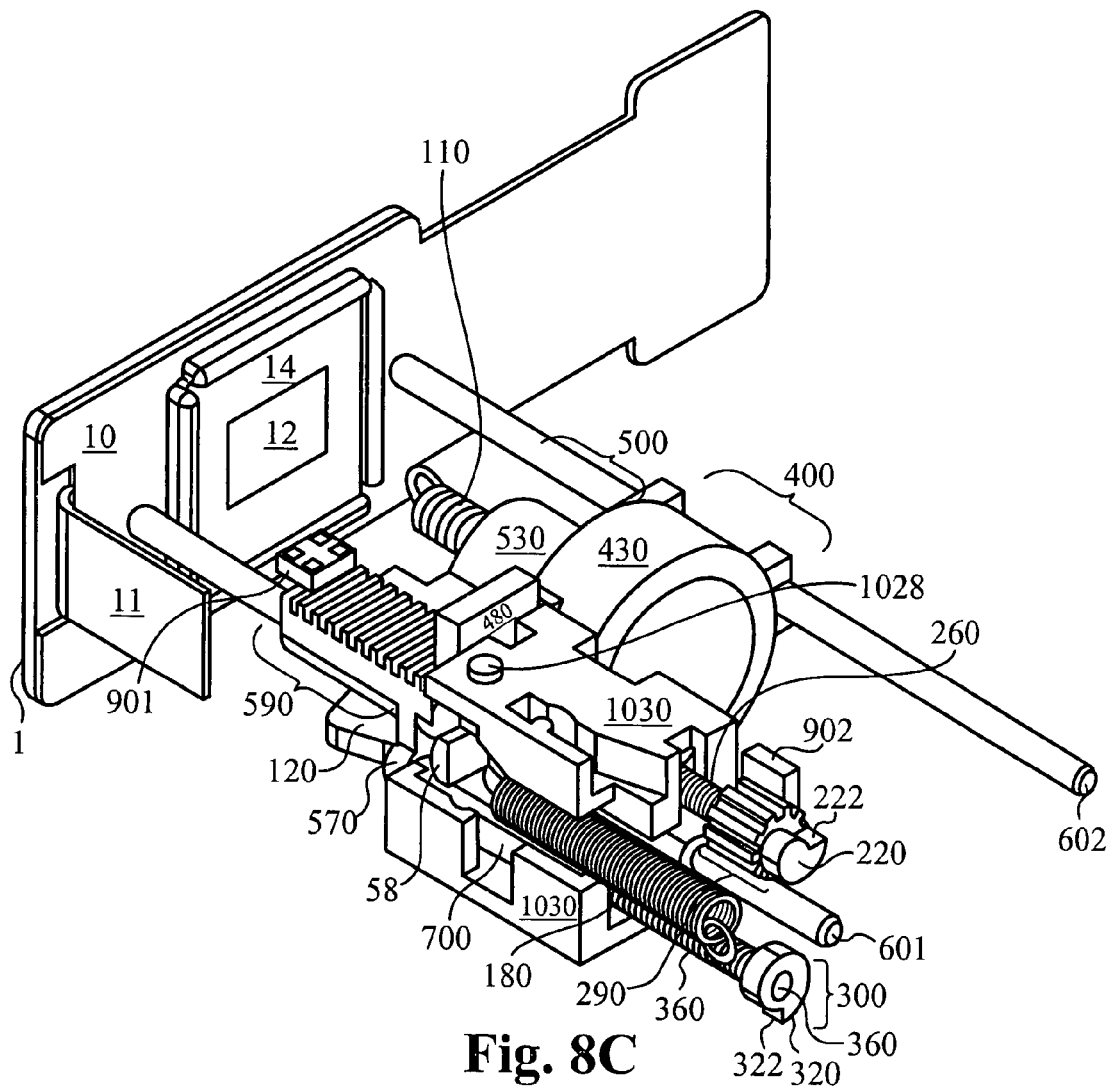
FIG. 8C illustrates an auto-focus and zoom module in a tele position in accordance with some embodiments of the invention.

In FIGS. 8B and 8C, the modules are in mid position and tele position, respectively. Preferably, the sensing targets 590 and 290 are engaged with the position sensors 901 and 902, respectively, while in mid and tele position. Preferably, the position sensors and sensing targets are engaged throughout all zoom positioning.

Mechanical Hard Stop Latch

Preferably, embodiments of the present invention include features configured to permit referencing of the optics group via a mechanical hard stop.

Referring now to FIGS. 3 and 4, these embodiments include the hard stop latch spring 310 and the hard stop latch spring 410. The hard stop latch spring 310 is mounted to the main body 20 on the spring boss 21. As shown in FIGS. 3 and 4, the hard stop latch spring 310 comprises a substantially rigid body and an active spring 312. The rigid body includes the lens group interface surface 314, the pivot hole 318, and the latch 316. The lens group interface surface 314 and the latch 316 are each arranged on separate arms positioned approximately 90 degrees apart around the pivot hole 318, and extending outward therefrom. The latch 316 arm is substantially longer than the group interface surface 314 arm. At rest the active spring 312 is aligned with the latch 316 arm.

The pivot hole 318 is mated with the spring boss 21 and configured to pivot around the boss 21. The group interface surface 314 is configured to mate with the spring driver 580 of the rear lens group 500. At rest, the latch 316 is disposed out of line with the actuator housing 1030, e.g. FIG. 5A. The hard stop latch spring 310 pivots around the hole 318 when the spring driver 580 urges the group interface surface 314 toward the image sensor, flexing the active spring 312. When pivoted, the latch 316 moves into place to interface with the cam feature 322 of the cam 320. This provides a mechanical hard stop for the lead screw 360.

Figure 5B:
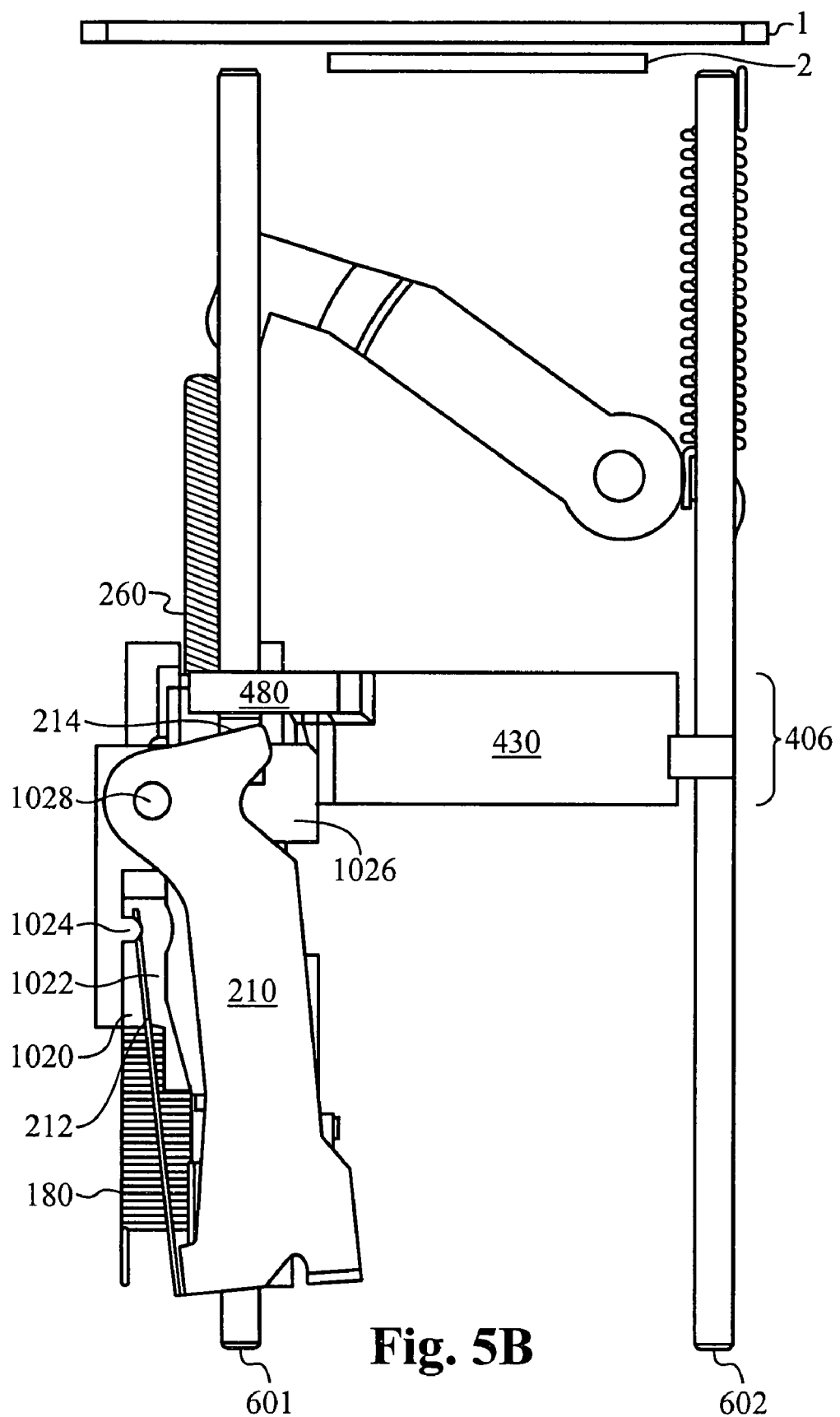
FIG. 5B is a plan view of internal spring elements of an auto-focus and zoom module in a mid position in accordance with some embodiments of the invention.

The hard stop latch spring 210 is mounted to the actuator housing 1020 on the spring boss 1028, as shown in FIG. 5B. The hard stop latch spring 210 comprises a substantially rigid body and an active spring 212. The rigid body includes the lens group interface surface 214, the pivot hole 218, and the latch 216, e.g. FIG. 4. The lens group interface surface 214 and the latch 216 are each arranged on separate arms positioned approximately 90 degrees apart around the pivot hole 218, and extending outward therefrom. The latch 216 arm is substantially longer than the group interface surface 214 arm. At rest the active spring 212 is aligned with the latch 216 arm.

The pivot hole 218 is mated with the spring boss 1028 and configured to pivot around the boss 1028. The group interface surface 214 is configured to mate with the spring driver 480 of the front lens group 400. At rest, the latch 216 is disposed out of line with the actuator housing 1020, e.g. FIG. 5A. The hard stop latch spring 210 pivots around the boss 1028 when the spring driver 480 urges the group interface surface 214 toward the image sensor, flexing the active spring 212. When pivoted, the latch 316 moves into place to interface with the cam feature 222 of the cam 220. This provides a mechanical hard stop for the lead screw 260, e.g. as shown in FIG. 8A.

Position Sensing

Embodiments of the present invention include position-sensing elements configured to provide feedback to an actuator control system. These elements permit the module to accurately position functional groups, e.g. optics, by using non-linear actuator motors.

Preferred embodiments of the present invention employ a sensing target that moves in concert with a functional group of the module, and a sensor configured to detect and encode data representing movement of the sensing target. For example, some embodiments use reflection encoding of a mobile sensing target that comprises regions of differing reflectance. An exemplary position sensing system comprises the position sensors 1030 and the position sensing targets 250 and 350 of the module 1000 of FIG. 1.

Reflection Encoding

In the exemplary reflection encoding system, a sensor includes an element that emits radiation and an element that detects radiation. A target includes dark and light bands, for example. The dark bands tend to absorb a greater proportion of the emitted radiation than do the light bands. The radiation reflected by the bands is detected by the sensor. As the target moves relative to the sensor, the absorption and reflectance of the sensing target portion aligned with the sensor varies. The sensor encodes this variation. A variety of encoding algorithms and processes are consistent with the present invention. For example, a sensor could simply detect each transition between a dark and light band.

System Resolution

The resolution of a reflection encoding system is determined by several factors. The distance between the emitter/detector and the target, the beam spread of the radiation used, and the native target resolution all play a role in determining a resolution of a system. These three factors do not act separately, rather they interact, and each must be tuned relative to the others.

Native target resolution is essentially a function of feature size. The smaller the critical dimension—the dimension parallel to sensor movement—of a target's features, the greater its native target resolution. For example the target 590 of FIGS. 8A and 8B uses stripe pairs as features. The sensing system is configured to move stripes along their narrow dimension across a field of view of the sensor. Thus a critical dimension of a stripe pair in the illustrated configuration is its width along the narrow dimension.

However, a position sensing system does not guarantee high resolution simply by using a high native target resolution. A suitable combination of low beam spread radiation and tight emitter-target tolerances is required to achieve a maximal resolution permitted by a given feature size. The beam spread and tolerance specifications are complementary: a decrease in beam spread combined with an appropriate increase in tolerance can maintain a given resolution, and vice versa.

For a given feature size, there is a maximum radiation beam spread above which the features are not resolvable via reflection encoding. FIG. 11B illustrates the maximum beam spread for a series of light sources (white squares on left hand side) emitting light towards a series of absorptive and reflective bands (right hand side). The detail shown in FIG. 11C illustrates a 20-micron wide light source paired with a target having similarly-sized features. In this example, the maximum tolerable spread is 10 microns; other systems allow other spreads.

Under set diffusion conditions, the maximum tolerable spread and desired resolution determine a maximum spacing between a radiation source and the target. This spacing, distance d in FIG. 11C, is proportional to the required resolution, and inversely proportional to the tangent of an angle representing the diffusion of the radiation. For example, given a typical LED diffusion angle of 30 degrees, to achieve 10 micron resolution the distance d should be less than 56.7 microns. Thus, to achieve the native target resolution, a suitable combination of beam spread radiation and spacing should be employed.

Native Target Resolution

Some embodiments of the present invention employ position sensing systems with beam spread and tolerance optimized to operate at native target resolution. In reflection encoding, a variety of methods, strategies, and devices are available to achieve this goal.

Figure 12A:
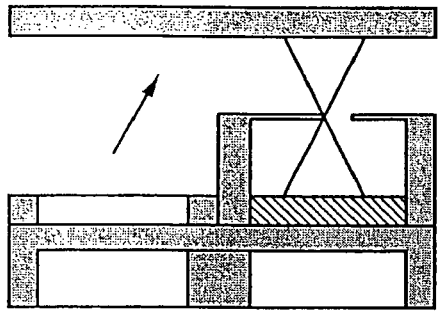
FIG. 12A is a schematic illustration of a direct imaging solution for position sensing in schematic representation of beam spreading that occurs during position sensing in accordance with some embodiments of the invention.

FIG. 12A illustrates a direct imaging approach where a radiation emitter (white rectangle), e.g. an LED, produces radiation which is supplied to the target without additional processing. A portion of the radiation reflecting from the target is detected by a detector (hatched rectangle). In this type of approach, the emitter must produce radiation with a sufficiently low beam spread to resolve the target features.

Tolerances

One method of achieving native target resolution is closely spacing the emitter/detector and the scanning target. However, tightening tolerances increases the precision required in manufacturing both the target, and the device as a whole. For example, the cross-sectional roundness of a cylindrical target becomes increasingly important as the spacing decreases. For these and other reasons, embodiments of the present invention preferably space the emitter/detector and scanning target at distances achievable within tolerances typical of mass-manufacturing.

Active Area—Emitter/Detector Modification

Figure 15:
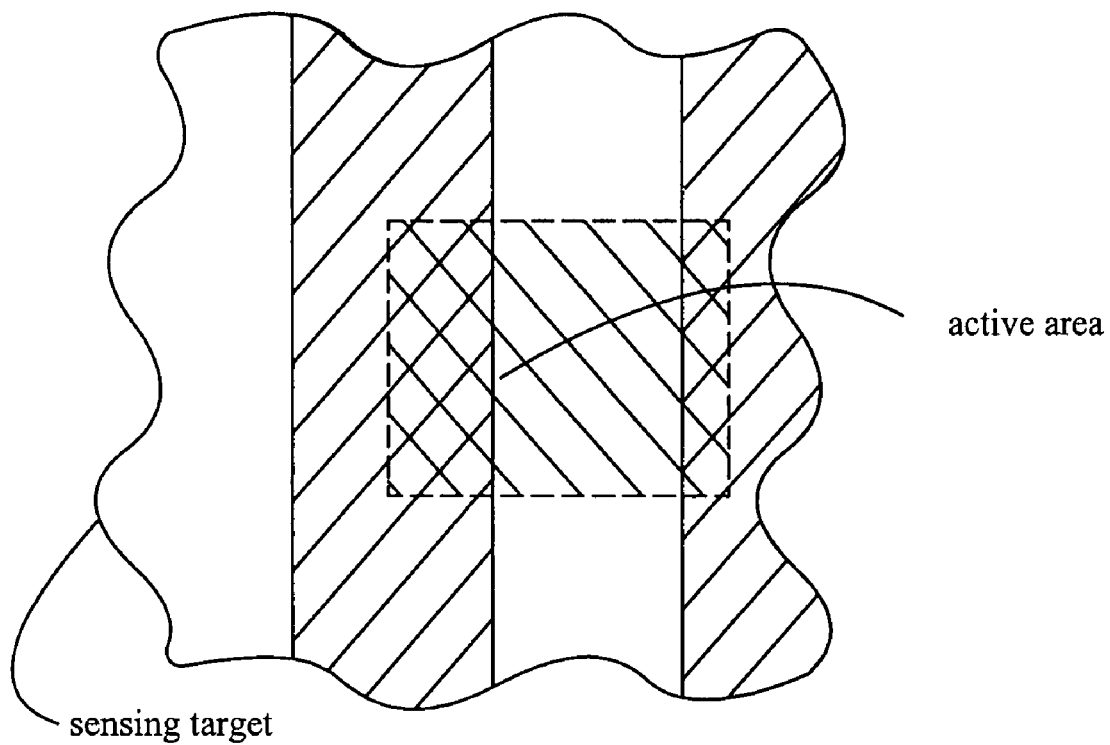
FIG. 15 is a detailed schematic of an active area of interface between a sensing target and a sensor consistent with some embodiments of the invention.

Several combinations of features and methods can be employed to lessen the spacing requirements tolerances or decrease problems caused by diffusion of the radiation. In reflection encoding, a portion of the sensing target is excited by radiation and a detector receives a signal from the sensing target. The signal received represents the characteristics of an active area of the sensing target. Preferably, the active area is sized and located to match critical feature dimensions of the sensing target. For example, FIG. 15 illustrates the active area of a sensing target.

The size and location of the active area are determined by characteristics of both the emitter and the detector. In some cases, the radiation is conditioned to limit the portion of the sensing target excited by radiation. In some cases, the field of view of the detector is cropped.

Figure 12B:
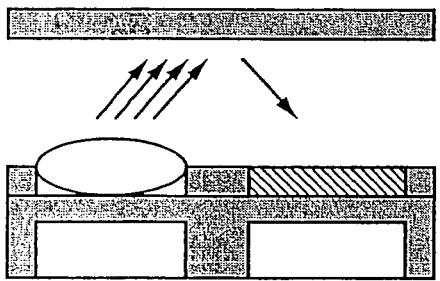
FIG. 12B is a schematic illustration of a lens-based imaging solution for position sensing in accordance with some embodiments of the invention.

Some techniques involve radiation processing measures that permit the use of higher resolution targets at manufacturable spacings than would be possible using more diffusive radiation. FIG. 12B illustrates a system in which a lens is used to collimate radiation from a detector. Collimating the radiation permits target-sensor spacing to increase relative to direct imaging while maintaining ability to resolve a set feature size. The maximum spacing and resolvable feature sizes are determined by the spreading of the radiation following collimation.

Figure 12C:
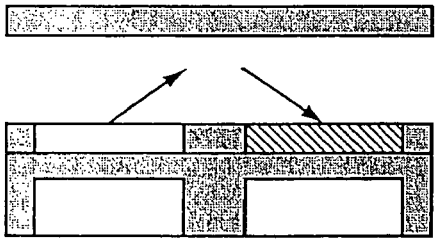
FIG. 12C is a schematic illustration of a pinhole-based imaging solution for position sensing in accordance with some embodiments of the invention.

Some techniques involve elements configured to limit the field of view of a sensor to a portion of its native field of view. FIG. 12C illustrates a system in which a pinhole is used to prevent 'bleed over' from an adjacent region from preventing detection of a transition. In this case, reflected radiation must pass through the centered pinhole placed near to the target surface before reaching the detector. This system can require higher intensity emitters, as relatively little radiation is available through the pinhole.

Though certain embodiments of the present invention do employ active area cropping strategies, such as radiation conditioning, the additional devices or features needed to carry out these strategies increases the cost and complexity of the manufactured module. Preferably, embodiments of the present invention employ other means to achieve desired resolutions.

Beyond Native Target Resolution

At certain thresholds, achieving high system resolution though use of high native target resolution begins to necessitate radiation conditioning or tight spacing. As outlined above, these elements increase the complexity of a module and the precision required in manufacturing. Therefore, for resolutions above these thresholds, embodiments of the present invention preferably employ a lower native target resolution combined with at least one of a variety of strategies for achieving system resolution greater than native target resolution.

Active Area—Target Modification

The methods of defining an active area referred to above relate to conditioning radiation from an emitter, selecting a detector with an appropriate field of view, or modifying the field of view using an external device. However, alternative methods relate to configuring the sensing target to limit the portion thereof excited by radiation at any one time, and thus cropping the active area.

Figure 11A:
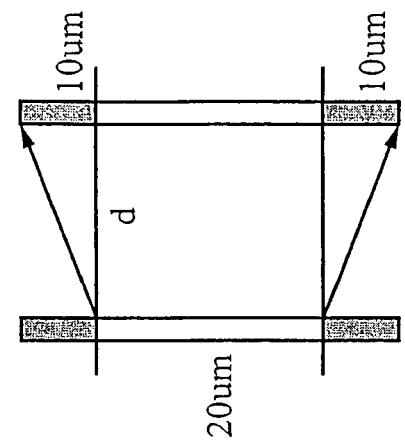
FIG. 11A is a schematic representation of a position sensor in accordance with some embodiments of the invention.
Figure 11B:
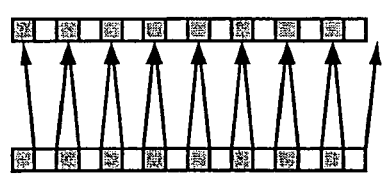
FIG. 11B is a schematic representation of beam spreading that occurs during sensing in accordance with some embodiments of the invention.
Figure 11C:
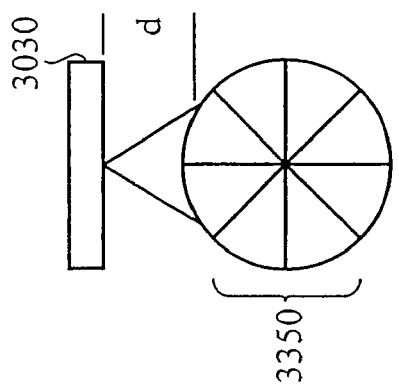
FIG. 11C is a schematic representation of beam spreading that occurs during sensing in accordance with some embodiments of the invention.

For example, the cross-sectional view of FIG. 11A illustrates a configuration in which the feature size is paired with arc of a cylindrical sensing target to limit the field of view of a detector. The field of view of the emitter/detector 3030 subtends a region of the target 3350 that includes a maximum of two transitions.

Preferably, the sensing target and detector are configured such that a single feature dominates the field of view. For example, as illustrated in FIG. 15, an active area is sized to match the width of a stripe pair. Typically, the feature size of the target is chosen based on the field of view. However, the required resolution can also be a factor in determining feature size.

Data Processing

Preferably, embodiments of the present invention process data from a sensor to achieve resolutions higher than native target resolution. A variety of processing techniques, methods and elements are employed within various embodiments of the invention, including threshold-based signal conversion and interpolation.

Preferably, embodiments of the present invention encode a portion of the sensing target within the active area into an voltage. The voltage varies depending on the character of the portion of the sensing target within the active area at time of encoding.

Embodiments of the present invention preferably match the dimensions of the active area to the critical dimensions of the sensing target features in order to produce a smoothly varying signal. FIG. 15 illustrates a preferred relationship between the active area and sensing target feature dimensions. The active area is sufficiently large along the direction of the critical dimensions so that it will not sequentially encounter regions with the same light/dark characteristics. In the illustrated embodiment, along the critical dimension the active area is larger than one feature's width and smaller than twice that width. This type of configuration substantially prevents 'flat' spots from occurring within the analog signal produced.

Figure 16:
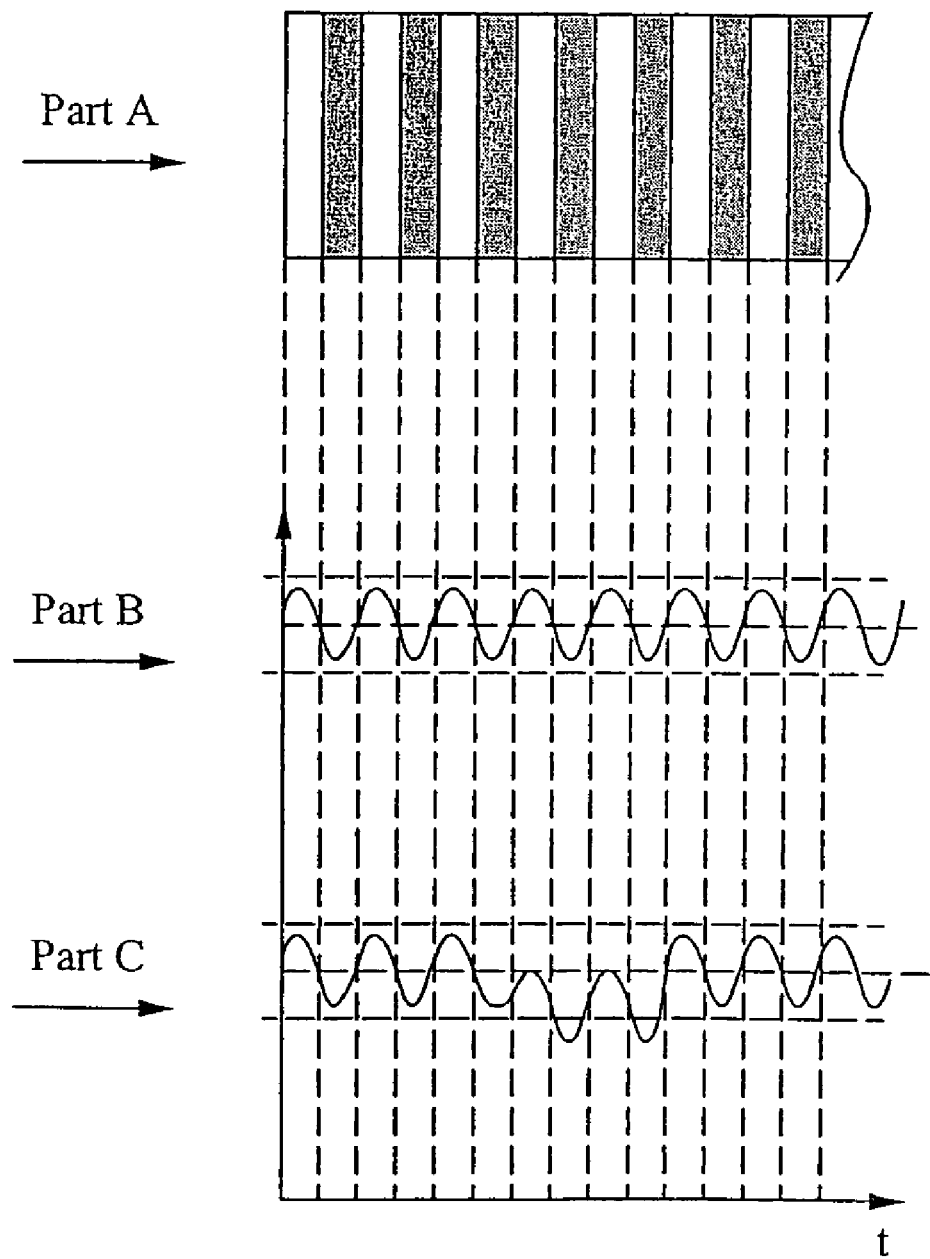
FIG. 16 is a schematic representation of a signal produced from a sensing target consistent with some embodiments of the invention.

Over time, as the sensing target moves through the active area, the system forms a signal representing the portions of the sensing region that have passed through the area. As shown in FIG. 16, a sensing target, part A, and a varying signal, part B, are correlated along a time axis t. The strength of the signal in part B at a given point in time is determined by the characteristics, e.g. the proportion of light and dark stripe, within the active region at that time. As illustrated, the minima of the signal in part B correspond in time to the central axes of the dark stripes. Similarly, the maxima of the signal in part B correspond in time to the central axes of the light stripes.

In some embodiments the signal is a continuous encoding of the voltage, in other embodiments the signal is a series of discrete samples taken at a particular frequency. In either case, the signal preferably contains multiple samples related to each feature of the sensing target as it moves across the sensor's field of view.

The encoding process produces a variable signal representing the movement of the sensing target. The minima and maxima of the signal represent movement of the sensing target at its native target resolution. Preferably, this variable signal is an analog voltage. In some embodiments, interpolation is used to construct higher resolution data between the minima and maxima of the variable signal. Preferably the interpolation error occurs only within a given period of the native target resolution and is reset with each minimum or maximum of the signal. This limits the error introduced by interpolation to a substantially fixed percentage of the native resolution.

A processing system receives a variable signal from the sensor and produces corrected movement data at a resolution higher than native target resolution. For example, in some embodiments, the analog voltage signal is supplied to an analog to digital converter (ADC). The analog signal, which was produced at a sampling rate that results in multiple samples per feature, contains sufficient information to support ADC production of digital signal with a resolution greater than native target resolution. In some embodiments, an ADC process using multiple thresholds is used to encode an analog signal to a higher-resolution digital signal.

The corrected movement data is then translated into position data which represents the position of a functional group coupled to the sensing target. For example, in some embodiments digital data from the ADC is supplied to a controller where it is analyzed and translated into position data.

Figure 17:
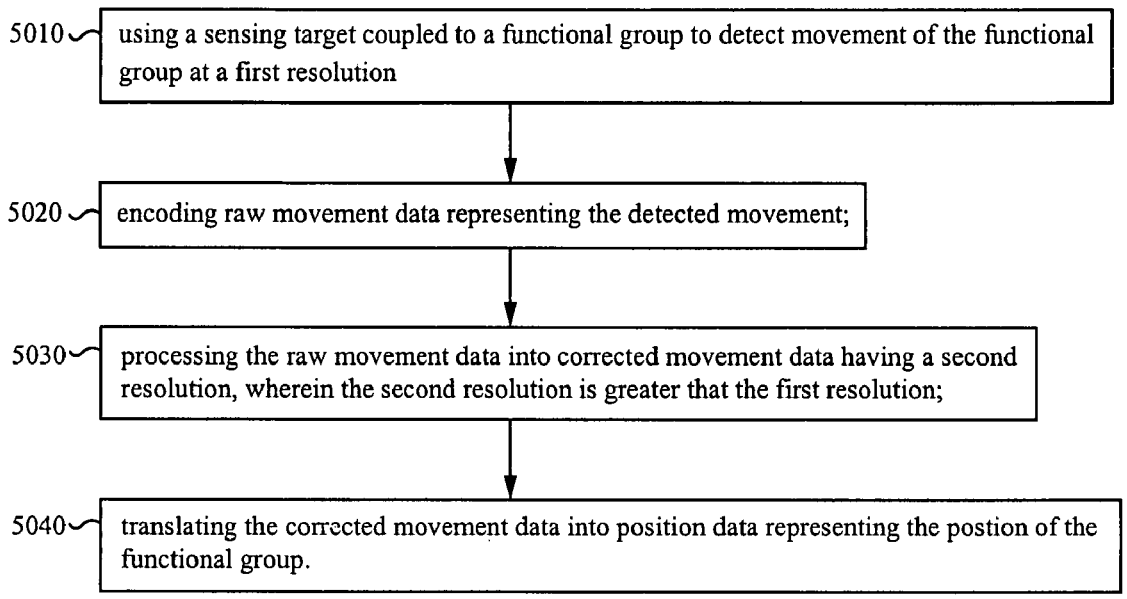
FIG. 17 is a flowchart illustrating a method of sensing a position consistent with some embodiments of the present invention.

One method in accordance with the present invention is illustrated in FIG. 17. The method seeks to detect a position of a functional group coupled to a sensing target configured to represent movement of the functional group a first resolution. It comprises a step 5010, of using the sensing target to detect movement of the functional group at the first resolution. The method further comprises a step 5020, of encoding raw movement data representing the detected movement. In another step 5030, the method comprises processing the raw movement data into corrected movement data having a second resolution, wherein the second resolution is greater than the first resolution. Further, the method includes a step 5040, of translating the corrected movement data into position data representing the position of the functional group.

Preferably, embodiments include additional calibration of processing circuitry. In the preferred embodiment, an initial calibration is accomplished automatically during power on. For example, in an ADC-based system, self-calibration during power-on preferably determines the input range needed for data. Embodiments that use self-calibration do not require initial calibration during manufacturing or storage of fixed calibration parameters over their lifetime. In addition, the calibration preferably defines the initial position for each functional group. In some embodiments, these initial positions are determined by a hard reference stop discussed elsewhere in greater detail. In some embodiments, the positions are determined via information embedded into the sensing target. In some embodiments, position is referenced by the absence of interaction between the sensor and sensing target.

Specifically, referring to FIG. 14A, as the rear barrel 530, sensing target 590 and guide sleeve 510 move along the guide pin 601, the sensing target 590 and the sensor 901 eventually become disengaged. At this point the signal read by the sensor 901 changes, permitting the system to reference the location of the sensing target 590, the rear barrel 530, or the rear lens (not shown). In addition, during the same movement, the spring driver 580 contacts the lens group interface surface 314 of the hard stop latch spring 310, eventually reaching a mechanical hard stop, which can also be used as a reference as described above.

Referring now to FIG. 14B, a similar process can be employed for the front lens position sensor. The front sensing target 290 and the sensor 902 eventually become disengaged during movement of the front lead screw 260. At this point the signal read by the sensor 902 changes, permitting the system to reference the location of the front sensing target 290, or the front lens (not shown). In addition, during the same movement, the cam feature 222 of the cam 220 contacts the lens group interface surface 216 of the hard stop latch spring 210, eventually reaching a mechanical hard stop, which can also be used as a reference as described above.

However, some embodiments also include continuous calibration during sensing to handle signals with noisy time-variance. A variety of configurations produce signals with slight instabilities over time. For example, FIG. 16, part C illustrates a signal with an average magnitude that 'wobbles'. A variety of design and manufacturing decisions may result in such signals, for example off center mounting of a cylindrical sensing target. In some embodiments a calibration constant correlated to instabilities is used to counteract them and dynamically correct the processing output. For example, the average magnitude over a trailing time or frequency period.

In some embodiments, non-volatile memory elements are included in the control or processing circuitry and used to provide additional manufacturing and calibration data. Preferably, this additional data is used to adjust for component variation and manufacturing tolerances.

Some embodiments that employ interpolation use additional hardware and/or firmware (e.g. a clock for timing and for analysis). If the actuator is very non-linear, interpolation can introduce positioning error. Preferably, embodiments of the present invention use ADC techniques.

Configurations

Embodiments of the present invention include position sensing systems that employ a variety of different configurations of sensors and sensing targets. Some embodiments include cylindrical sensing targets, closed surfaces configured to rotate along with a lead screw or other rotational drive mechanism. Since the functional group is coupled with the lead screw, which has known thread pitch, lead screw rotation is proportional to translation of the functional group along the lead screw axis. In addition, some embodiments include linear sensing targets coupled to a functional group and configured to move therewith. The sensing systems discussed in the examples below are illustrated with cylindrical sensing targets; however, the methods, strategies and equipment described are also contemplated for use with linear targets within some embodiments of the present invention.

For example, a system employing a rotational sensing target is illustrated in FIG. 11A. As shown by the cross sectional view, a position sensing system includes the cylindrical target 3350 positioned a distance d from the emitter/detector 3030. The field of view of the emitter/detector 3030 subtends a region of the target 3350 that includes a maximum of two transitions. In some embodiments the emitter/detector is a photoreflector.

In another example, illustrated in FIG. 13B, an emitter/detector 4030 comprises a sensor 4034, and an emitter 4032. The emitter/detector further includes a mask structure 4030' includes the emitter window 4032' and the two sensor windows 4034' and 4034". In some embodiments the emitter is an LED.

The dark bands of the sensing target 4350 absorb radiation emitted from the emitter, while the light bands of the sensing target reflect radiation emitted from the emitter. The sensors detect transitions in absorption and reflectance as the bands move relative to the sensor windows. Preferably, the sensor 4034 separately detects transitions in both sensor windows 4032' and 4034". In some embodiments the emitter/detector 4030 is a photoreflector.

In yet another example, illustrated in FIG. 13A, an two-detector module is employed. The emitter/detector 3030 comprises a first sensor 3034A, a second sensor 3034B, and an emitter 3032. The mask structure 3030' includes the emitter window 3032' and the four sensor windows 3034A', 3034A", 3034B', and 3034B". In some embodiments, the emitter/detector 3030 is a photoreflector. In some embodiments the emitter is an LED.

Radiation from the emitter 3032 is substantially absorbed by dark bands and substantially reflected by the light bands of the sensing target 3350. The sensors 3034A and 3034B detect transitions in absorption and reflectance as the bands move relative to the sensor windows. Both the first sensor 3034A and the second sensor 3034B detect transitions.

In some embodiments, a detector encodes a given transition at different points in time. In addition, in some embodiments, a detector includes means for encoding a transition in two data forms that differ by a constant, such as a phase. In some embodiments, e.g. FIG. 13A, two separate sensors encode transitions out of phase of one another. In other embodiments, a single sensor views transitions at two different points in space, e.g. the two windows 3034' and 3034" of FIG. 13B. Preferably, in these embodiments a control system combines the out-of-phase data, permitting it to detect a direction of movement as well as its magnitude.

In a cylindrical sensing target within the above configurations, each feature preferably covers 60 degrees of the circumference. Thus, in one embodiment, a cylindrical target having a 12 mm circumference includes six 2 mm stripes in an alternating reflective/absorptive pattern. In addition, processing steps as outlined above are preferably employed to increase resolution above that offered natively by this type of target.

A position sensing system provides position data for a lens group over its range of motion. In some embodiments of the present invention, a position sensing system tracks the relative position of an optics group to within 70 microns over a range of 10 mm.

Operation

Preferred systems employ the position sensor data to control an actuator. In some embodiments, the data is used to predict the movement per cycle of the actuator. In some embodiments, the data is used to predict the movement per unit time that the actuator is engaged and powered on. In some embodiments, the data are used on a real-time basis with a correction cycle for increased accuracy. Preferably, the particular implementation used is determined in accordance with the particular actuator used.

Some embodiments of the present invention use the position data during zoom and auto-focus operation to accurately position and track optics groups. Preferably, during zoom operation, multiple lens groups are moved and tracked. The actuator control circuitry preferably accurately interprets position data to accomplish tracking and movement. In some embodiments, the control circuitry uses tracking interpretation data that is stored in a table. In some embodiments, the control circuitry uses tracking interpretation data that is stored as a mathematical function. Sometimes, this data is defined in a calibration cycle. Preferably, this calibration cycle takes place during manufacturing.

In addition, the actuator control circuitry preferably accomplishes zoom operations within a specified time frame. Preferably, in embodiments that relate to video optics, the zoom operations are accomplished in a manner that does not disturb video recording. In some embodiments, the zoom range and frame rate are used to determine an optimal step size. For example, the total zoom range is divided by the number of frames within the desired seek time to yield the step size. Thus, each step can occur within a frame. Preferably, when zoom operations occur, the steps are synchronized with the frame rate. In addition, the movement of multiple groups during zoom operations is preferably interleaved. Thus, as each group is moved, the remaining groups are stationary. Interleaving reduces driver and instantaneous power requirements.

In addition, during auto focus operation, typically a single group is moved. Preferably, a group is moved through a focus range in small increments. Preferably, an accurate position sensor and actuator control circuit is employed to permit s positioning in increments below 20 micrometers. In addition, though a variety of circuitry and hardware can be used to implement the auto-focus algorithm, preferred implementations permit reliable return of the group to the position that shows best focus.

As described above, the optical elements of some embodiments are divided into two groups, one group housed in a front barrel, the other group housed in a rear barrel. Typically, the precise motion of these optics groups group within confined spaces is achieved by using the mechanism(s) described above.

The form factor of the auto-focus and zoom module of some embodiments is approximately 9×14×22 mm without a prism or approximately 9×14×30 mm including a prism.

Embodiments of the present invention permit micro-scale positioning using non-linear motors within easily manufacturable devices. These embodiments include strategies to achieve system resolution above the native resolution of a sensing target, to deal with instabilities in movement data, and to provide repeatable referencing solutions for both initial and continuous calibration schemes.

A wide variety of mass manufactured devices require robust and precise positioning of functional elements. These include medical devices, optical devices, and micromechanical devices. With the present invention, such mass manufactured devices can use non-linear motors where linear motors were previously required.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A position sensing system configured to use a sensing target having pattern features with an average critical dimension thereupon, comprising:
    a. an encoding module, having an active encoding region through which the sensing target is configured to move, the encoding module configured to generate a signal representing information stored on a portion of the sensing target within the active encoding region, wherein the active encoding region has a dimension greater than the average critical dimension; and
    b. a processing module configured to convert the signal generated into position data via analysis of data comprising an input range condition and an initial position condition.

2. The position sensing system of claim 1, further comprising a control module configured to coordinate operation of the encoding module and the processing module.

3. The position sensing system of claim 2, wherein the input range condition and initial position condition are determined by the control module.

4. The position sensing system of claim 1, wherein the encoding module uses an analog to digital converter in generating the signal.

5. The position sensing system of claim 4, wherein the analog to digital converter relies on a threshold in generating the signal.

6. The position sensing system of claim 5, wherein past position data is used to determine the threshold.

7. A micropositioning module, comprising:
    a. a functional group coupled to a drive shaft;
    b. an actuator for translating the drive shaft to move the functional group;
    c. a sensing target configured to represent movement of the functional group at a first resolution; and
    d. a position sensing system configured with the sensing target to detect movement of the functional group at the first resolution as raw movement data, to process the raw movement data into corrected movement data having a second resolution, wherein the second resolution is greater than the first resolution, and to translate the corrected movement data into position data representing the position of the functional group.

8. The micropositioning module of claim 7, wherein the position sensing system comprises an encoding module configured to produce raw rotation data, a processing module configured to produce corrected position data, and a control module configured to coordinate operation of the encoding module and the processing module.

9. The micropositioning module of claim 8, wherein an input range condition and an initial position condition are determined by the control module.

10. The micropositioning module of claim 8, wherein the encoding module uses an analog to digital converter in generating the raw rotation data.

11. The micropositioning module of claim 10, wherein the analog to digital converter relies on a threshold in generating the raw rotation data.

12. The micropositioning module of claim 11, wherein past position data is used to determine the threshold.

13. A micropositioning module, comprising:
    a. a functional group coupled to a lead screw so that translation of the lead screw results in translation of the functional group along an axis parallel to the lead screw;
    b. an actuator for translating the lead screw;
    c. a sensing target configured to represent rotation of the lead screw at a first resolution; and
    d. a position sensing system configured with the sensing target to detect rotation of the lead screw at the first resolution as raw rotation data, to process the raw rotation data into corrected rotation data having a second resolution, wherein the second resolution is greater than the first resolution, and to translate the corrected rotation data into position data representing a position of the functional group.

14. The micropositioning module of claim 13, wherein the position sensing system comprises an encoding module configured to produce raw rotation data, a processing module configured to produce corrected position data, and a control module configured to coordinate operation of the encoding module and the processing module.

15. The micropositioning module of claim 14, wherein an input range condition and an initial position condition are determined by the control module.

16. The micropositioning module of claim 14, wherein the encoding module uses an analog to digital converter in generating the raw rotation data.

17. The micropositioning module of claim 16, wherein the analog to digital converter relies on a threshold in generating the raw rotation data.

18. The micropositioning module of claim 17, wherein past position data is used to determine the threshold.

19. A method of detecting a position of a functional group coupled to a sensing target configured to represent movement of the functional group at a first resolution, comprising:
    a. using the sensing target to detect movement of the functional group at the first resolution
    b. encoding raw movement data representing the detected movement;
    c. processing the raw movement data into corrected movement data having a second resolution, wherein the second resolution is greater than the first resolution; and
    d. translating the corrected movement data into position data representing the position of the functional group.

* * * * *